(12) United States Patent
Min et al.

(10) Patent No.: US 11,935,445 B2
(45) Date of Patent: Mar. 19, 2024

(54) ELECTRONIC DEVICE INCLUDING FLEXIBLE DISPLAY AND METHOD OF OPERATING THE SAME

(71) Applicant: Samsung Electronics Co., Ltd., Gyeonggi-do (KR)

(72) Inventors: Byungwoo Min, Gyeonggi-do (KR); Bokyou Ko, Gyeonggi-do (KR); Jihea Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 184 days.

(21) Appl. No.: 17/519,793

(22) Filed: Nov. 5, 2021

(65) Prior Publication Data

US 2022/0148476 A1     May 12, 2022

Related U.S. Application Data

(63) Continuation of application No. PCT/KR2021/016066, filed on Nov. 5, 2021.

(30) Foreign Application Priority Data

Nov. 6, 2020 (KR) .......... 10-2020-0147736
Dec. 11, 2020 (KR) .......... 10-2020-0173454

(51) Int. Cl.
G09G 3/00     (2006.01)
G06F 1/16     (2006.01)

(52) U.S. Cl.
CPC ........... G09G 3/035 (2020.08); G06F 1/1616 (2013.01); G06F 1/1635 (2013.01);
(Continued)

(58) Field of Classification Search
CPC ..... G06F 1/1652; G06F 1/1616; G06F 1/1635
See application file for complete search history.

(56) References Cited

U.S. PATENT DOCUMENTS 8,860,656 B1 * 10/2014 Cho .................. G06F 1/1643
345/173
10,769,755 B1   9/2020 Kline et al.
(Continued)

FOREIGN PATENT DOCUMENTS

CN     111026235     4/2020
EP     3 913 460     11/2021
(Continued)

OTHER PUBLICATIONS

International Search Report dated Feb. 10, 2022 issued in counterpart application No. PCT/KR2021/016066, 10 pages.
(Continued)

*Primary Examiner* — Todd Buttram
(74) *Attorney, Agent, or Firm* — The Farrell Law Firm, P.C.

(57) ABSTRACT

An electronic device including a flexible display that is rollable or slidable and a method for operating the electronic device are provided. A first screen of a first function is displayed in a first area of a flexible display exposed to the outside. When a rolling movement or a sliding movement of the flexible display is identified, device state information including information indicating a power level of a battery of the electronic device is acquired. A first screen redrawing method is determined from among multiple screen redrawing methods by using the device state information. During the rolling movement or the sliding movement, a second screen corresponding to the first screen is displayed in a second area exposed to the outside by the rolling movement or the sliding movement of the flexible display, according to the first screen redrawing method.

15 Claims, 17 Drawing Sheets

(52) U.S. Cl.
CPC ............... *G09G 2320/0626* (2013.01); *G09G 2330/021* (2013.01); *G09G 2340/04* (2013.01)

(56) References Cited

U.S. PATENT DOCUMENTS

| | | |
|---|---|---|
| 2013/0157646 A1 | 6/2013 | Ferren et al. |
| 2014/0092140 A1 | 4/2014 | Wadwha et al. |
| 2014/0247229 A1 | 9/2014 | Cho et al. |
| 2015/0220299 A1* | 8/2015 | Kim ..................... G06F 3/1446 |
| | | 345/1.3 |
| 2016/0239062 A1 | 8/2016 | Lee |
| 2016/0349971 A1 | 12/2016 | Chi et al. |
| 2018/0095502 A1* | 4/2018 | Yamazaki ............ H10K 59/121 |
| 2018/0275770 A1 | 9/2018 | Kang et al. |
| 2018/0329514 A1 | 11/2018 | Kwon et al. |
| 2019/0278336 A1 | 9/2019 | Choi et al. |
| 2019/0384438 A1 | 12/2019 | Park et al. |
| 2020/0050416 A1 | 2/2020 | Myung et al. |
| 2022/0122514 A1 | 4/2022 | Kwon et al. |
| 2022/0148476 A1* | 5/2022 | Min ........................ G06F 3/147 |

FOREIGN PATENT DOCUMENTS

| | | | |
|---|---|---|---|
| JP | 2005-055791 | 3/2005 | |
| KR | 1020050093501 | 9/2005 | |
| KR | 10-2007-0068843 | 7/2007 | |
| KR | 1020150039533 | 4/2015 | |
| KR | 1020160139320 | 12/2016 | |
| KR | 1020160150533 | 12/2016 | |
| KR | 1020180037780 | 4/2018 | |
| KR | 1020190105858 | 9/2019 | |
| KR | 10-2019-0141518 | 12/2019 | |
| KR | 1020200043361 | 4/2020 | |
| KR | 1020200124402 | 11/2020 | |
| WO | WO-2020013528 A1 * | 1/2020 | ............... G01B 7/24 |

OTHER PUBLICATIONS

European Search Report dated Dec. 5, 2023 issued in counterpart application No. 21889634.8-1224, 10 pages.

* cited by examiner

ELECTRONIC DEVICE INCLUDING FLEXIBLE DISPLAY AND METHOD OF OPERATING THE SAME

CROSS-REFERENCE TO RELATED APPLICATIONS

This application is a bypass continuation application of International Application No. PCT/KR2021/016066 designating the United States, and filed on Nov. 5, 2021 in the Korean Intellectual Property Receiving Office, and claims priority to Korean Patent Application No. 10-2020-0147736, filed on Nov. 6, 2020, and Korean Patent Application No. 10-2020-0173454, filed on Dec. 11, 2020, in the Korean Intellectual Property Office, the disclosures of which are incorporated herein by reference in their entireties.

BACKGROUND

1. Field

The disclosure relates generally to an electronic device including a flexible display, and more particularly, to an electronic device with adaptable screens based on the flexible display and a method for operating the same.

2. Description of Related Art

Various services are provided through an electronic device, such as, for example, a smartphone. In order to raise the effective value of an electronic device and satisfy user demands, communication service providers and electronic device manufacturers are developing electronic devices that provide functions and differentiation from other companies. Accordingly, the functions that are provided through an electronic device have been enhanced.

Portability of an electronic device and convenience in using a multimedia function may be improved. In using web surfing or a multimedia function, a user may find it more convenient to use an electronic device with a larger screen displayed. A larger display may be embedded in the electronic device to output the larger screen, but there may be a constraint on expanding the size of the display in consideration of the portability of the electronic device. A display using an organic light emitting diode may provide greater portability while providing a larger screen. The display using the organic light emitting diode (or an electronic device having the display embedded therein) may implement a stable operation even though the thickness of the display is considerably thin when manufactured. Accordingly, the display may be embedded in the electronic device in a foldable, bendable, or rollable manner.

SUMMARY

An electronic device may display, for example, various contents, such as an application execution screen or an icon, through a display. In an electronic device having a flexible display, as a structure for forming the electronic device is moved and the state of a display area of the flexible display is changed between an open or a closed state, the position or the size of displayed content may change.

While a display area is changed (e.g., extended or reduced) by a rolling movement or a sliding movement of the flexible display, a flexible display may change the position or the size of an originally displayed screen in consideration of the changed display area. When the position or the size of the originally displayed screen is changed, the electronic device may perform screen redrawing. However, the electronic device may consume a great amount of power while performing the screen redrawing at the time of sliding movement of the flexible display.

Various embodiments provide an electronic device that can determine, when a screen of a flexible display is extended or reduced, whether to perform screen redrawing according to a power state of a battery, so as to display a screen indicating a state of the extension or reduction of the flexible display, and a method for operating the same.

According to an aspect of the disclosure, an electronic device is provided that includes a battery and a flexible display that is rollable or slidable by a housing or a display support of the electronic device. A size of a display area of the flexible display, which is exposed to outside of the housing, is changed by a rolling movement or a sliding movement of the flexible display. The electronic device also includes a processor disposed in the housing. The processor is configured to display a first screen of a first function in a first area of the flexible display exposed to the outside of the housing. When the rolling movement or the sliding movement of the flexible display is identified, device state information including information on a power level of the battery is acquired. A first screen redrawing method is determined from among multiple screen redrawing methods by using the device state information. During the rolling movement or the sliding movement of the flexible display, a second screen corresponding to the first screen is displayed in a second area of the flexible display that is exposed to the outside of the housing by the rolling movement or the sliding movement, according to the first screen redrawing method.

According to an aspect of the disclosure, a method is provided for operating an electronic device including a flexible display that is rollable or slidable by a housing or a display support of the electronic device. A size of a display area exposed to the outside of the housing changes by a rolling movement or a sliding movement of the flexible display. A first screen of a first function is displayed in a first area of the flexible display exposed to the outside of the housing. When the rolling movement or the sliding movement of the flexible display is identified, device state information including information indicating a power level of a battery of the electronic device is acquired. A first screen redrawing method is determined from among multiple screen redrawing methods by using the device state information. During the rolling movement or the sliding movement, a second screen corresponding to the first screen is displayed in a second area exposed to the outside of the housing by the rolling movement or the sliding movement of the flexible display, according to the first screen redrawing method.

According to an aspect of the disclosure, a non-transitory computer-readable reading medium is provided that stores instructions which, when executed by a processor of an electronic device, cause the processor to display a first screen in a first area exposed to an outside of a housing of in the electronic device. When a rolling movement or a sliding movement of the flexible display is identified, device state information including information indicating a power level of a battery of the electronic device is acquired. A first screen redrawing method is determined from among multiple screen redrawing methods by using the device state information. During the rolling movement or the sliding movement of the flexible display, a second screen corresponding to the first screen is displayed in a second area of the flexible display that becomes exposed to the outside of the housing as the flexible display is extended or reduced by the rolling movement or the sliding movement of the flexible display, according to the first screen redrawing method. The flexible display is rollable or slidable by the housing of the electronic device or a support of the flexible display, and a size of the display area exposed to the outside of the housing changes by the rolling movement or the sliding movement of the flexible display.

According to an embodiment, when a screen of the flexible display is extended or reduced, an electronic device including a flexible display can determine whether to perform screen redrawing and/or determine a screen redrawing method according to a power state of a battery, thereby displaying a screen indicating a state of extension or reduction of a screen of the flexible display.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
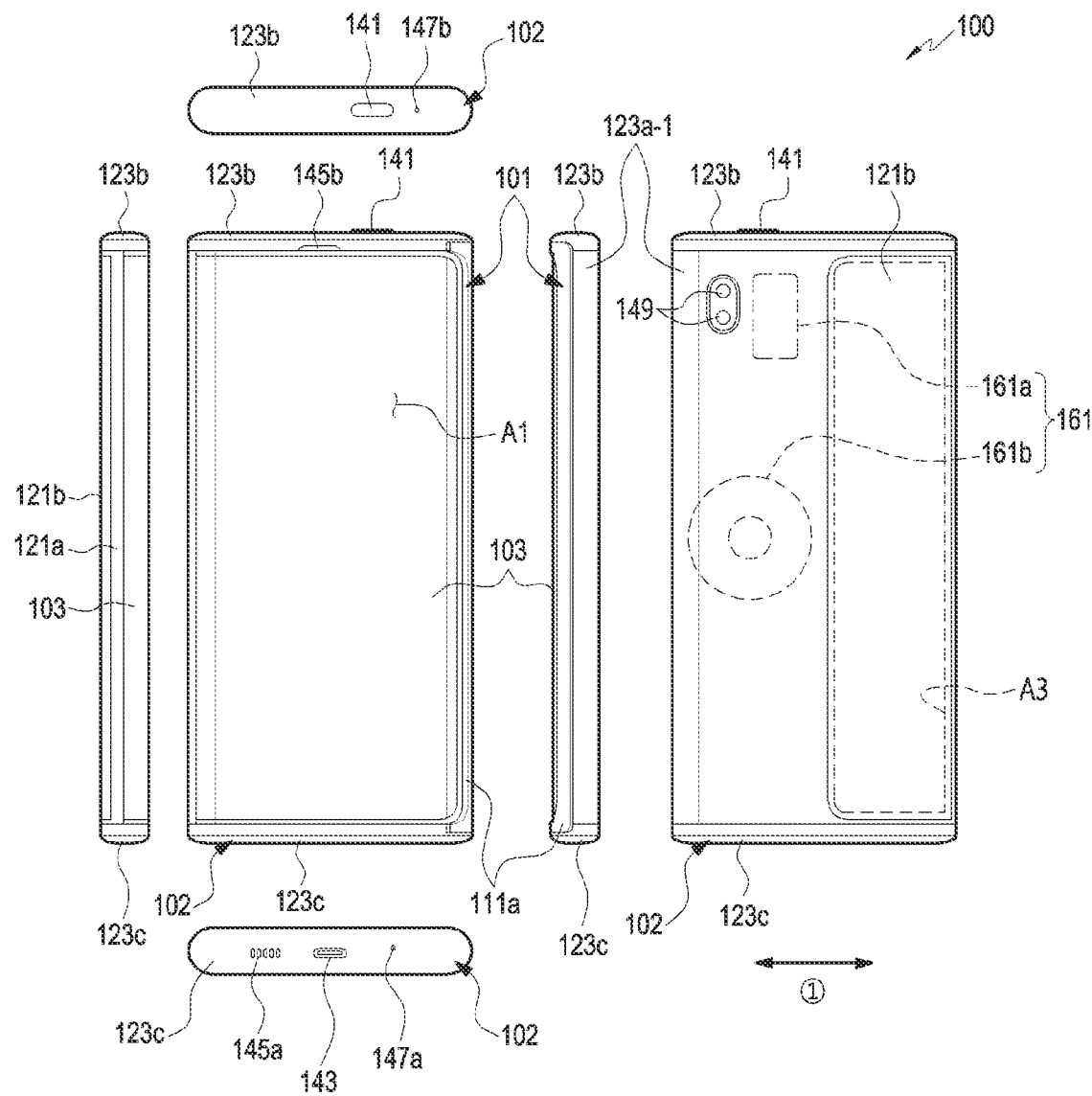
FIG. 1 is a diagram illustrating an electronic device in a state in which a part of a flexible display is received in a second structure, according to an embodiment.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration.

According to various embodiments, operations performed by the module, the program, or another component may be carried out sequentially, in parallel, repeatedly, or heuristically, or one or more of the operations may be executed in a different order or omitted, or one or more other operations may be added.

Figure 2:
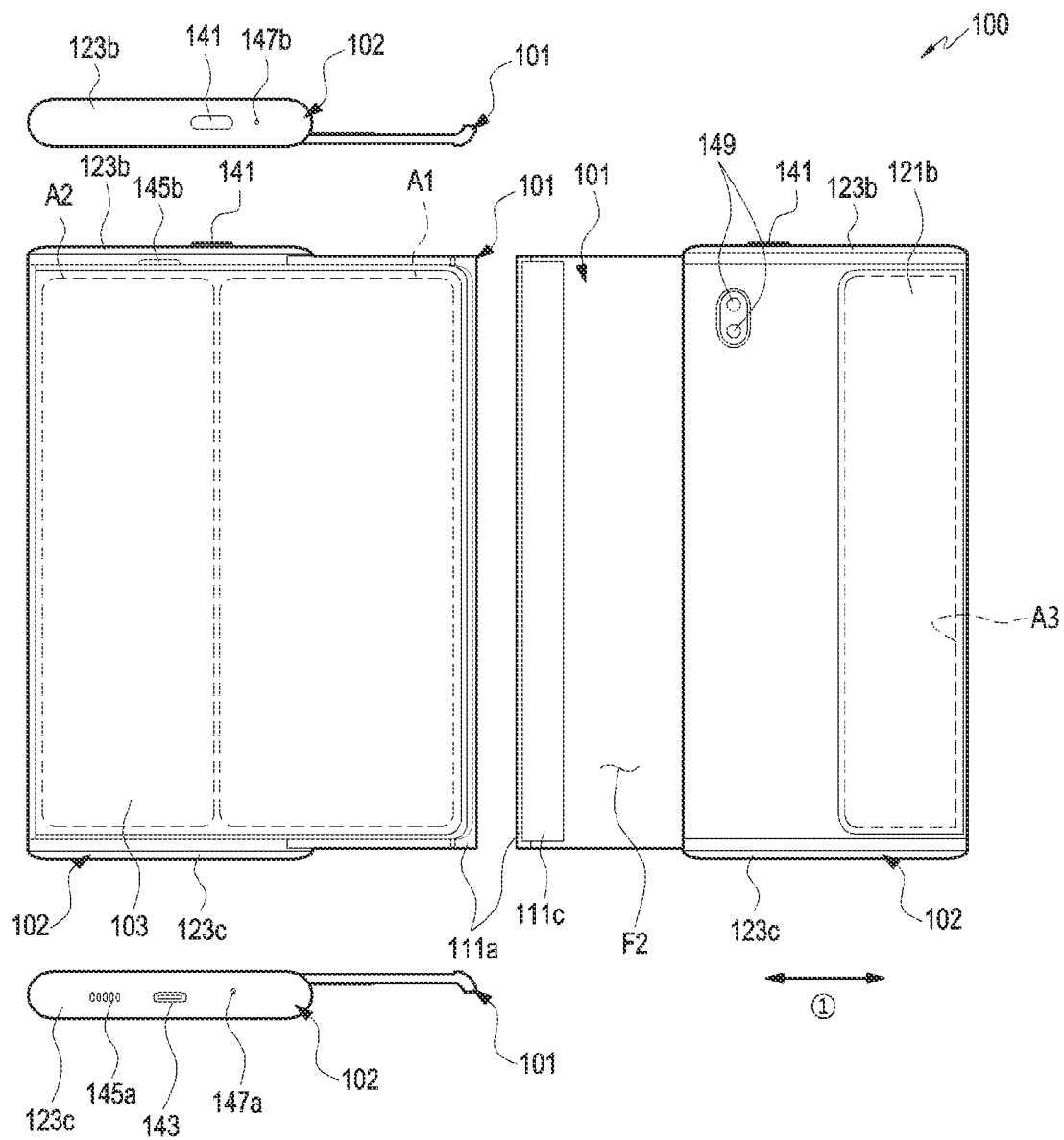
FIG. 2 is a diagram illustrating an electronic device in a state in which most of a flexible display is exposed to the outside of a second structure, according to an embodiment.

FIG. 1 is a diagram illustrating an electronic device, in a state in which a part of a flexible display is received in a second structure, according to an embodiment. FIG. 2 is a diagram illustrating an electronic device in a state in which most of the flexible display is exposed to the outside of the second structure, according to an embodiment.

The state illustrated in FIG. 1 may be defined as a state in which a first structure 101 is closed with respect to a second structure 102, and the state illustrated in FIG. 2 may be defined as a state in which the first structure 101 is opened with respect to the second structure 102. Accordingly, "the closed state" or "the open state" may be defined as a state in which an electronic device is closed or open. An electronic device 100 includes the first structure 101 and the second structure 102 moveably disposed in the first structure 101. It may be understood that in the electronic device 100, the first structure 101 is rollably or slidably disposed on the second structure 102. Between the closed state and the open state, the first structure 101 may be disposed to be reciprocatable in the illustrated direction, as indicated by arrow (1), with reference to the second structure 102.

The first structure 101 includes a first plate 111a (e.g., a slide plate), a first surface F1 (see FIG. 3) including at least a part of the first plate 111a, and a second surface F2 oriented opposite to the first surface F1. The second structure 102 includes a second plate 121a (e.g., a rear case), a first sidewall 123a extending from the second plate 121a, a second sidewall 123b extending from the first sidewall 123a and the second plate 121a, a third sidewall 123c which extends from the first sidewall 123a and the second plate 121a and is parallel to the second sidewall 123b, and a rear plate 121b (e.g., a rear window). The second sidewall 123b and the third sidewall 123c may be formed to be perpendicular to the first sidewall 123a. Each of the second plate 121a, the first sidewall 123a, the second sidewall 123b, and the third sidewall 123c may have one side (e.g., a front face) opened so as to receive (or surround) at least a part of the first structure 101. For example, the first structure 101 may be coupled to the second structure 102 while being at least partially surrounded by the second structure 102, and may be rollable or slidable, while being guided by the second structure 102, in the direction parallel to the first surface F1 or the second surface F2, for example, as indicated by arrow ①.

The second sidewall 123b or the third sidewall 123c may be omitted. Each of the second plate 121a, the first sidewall 123a, the second sidewall 123b, and the third sidewall 123c may be formed as a separate structure and coupled or assembled. The rear plate 121b may be coupled to surround at least a part of the second plate 121a. The rear plate 121b may be substantially integrally formed with the second plate 121a. The second plate 121a or the rear plate 121b may cover at least a part of the flexible display 103. For example, the flexible display 103 may be at least partially received in the second structure 102, and the second plate 121a or the rear plate 121b may cover a part (e.g., the second area A2) of the flexible display 103 received in the second structure 102.

The first structure 101 may be movable in the open state and the closed state with respect to the second structure 102 in a first direction (e.g., direction (j) parallel to the second plate 121a (e.g., the rear case) and the second sidewall 123b. In the closed state, the first structure 101 is spaced apart from the first sidewall 123a by a first distance, and in the open state, the first structure 101 is spaced apart from the first sidewall 123a by a second distance that is greater than the first distance. In the closed state, the first structure 101 may be positioned to surround a part of the first sidewall 123a.

The electronic device 100 includes a display 103, a key input device 141, a connector hole 143, audio modules 145a, 145b, 147a, and 147b, and a camera module 149. The electronic device 100 may further include an indicator (e.g., an LED device) and/or various sensor modules.

The display 103 includes a first area A1 and a second area A2. The first area A1 substantially extends across at least a part of the first surface F1 and may be disposed on the first surface F1. The second area A2 extends from the first area A1 and may be inserted into or received in the second structure 102 (e.g., a housing), or may be exposed to the outside of the second structure 102, according to rolling movement or sliding movement of the first structure 101. As described in greater detail below, the second area A2 may substantially move while being guided by a roller 151 (FIG. 3) mounted in the second structure 102 so as to be received in the second structure 102 or exposed to the outside of the second structure 102. For example, while the first structure 101 performs a rolling movement or a sliding movement, a part of the second area A2 may be transformed into a curved shape in the position corresponding to the roller 151.

As seen from above the first plate 111a (e.g., a slide plate), when the state of the first structure 101 changes from the closed state to the open state, the second area A2 substantially forms a flat surface together with the first area A1 while the second area A2 is gradually exposed to the outside of the second structure 102. The display 103 may be disposed to be adjacent to or coupled to a touch sensing circuit, a pressure sensor capable of measuring touch strength (pressure), and/or a digitizer for detecting a stylus pen of a magnetic field type. The second area A2 may be at least partially received in the second structure 102, or a part of the second area A2 may be exposed to the outside even in the closed state illustrated in FIG. 1. Regardless of whether the electronic device 100 is in the closed state or the open state, an exposed part of the second area A2 may be positioned over the roller 151, and a part of the second area A2 may maintain a curved shape in the position corresponding to the roller 151.

The key input device 141 is disposed at the second sidewall 123b or the third sidewall 123c of the second structure 102. The electronic device 100 may be manufactured to omit the illustrated key input device 141 or include an additional key input device. The electronic device 100 may include a home key button or a touch pad disposed around the home key button. At least part of the key input device 141 may be positioned in an area of the first structure 101.

The connector hole 143 may be omitted, and may accommodate a connector (e.g., a universal serial bus (USB) connector) for transmitting or receiving power and/or data to or from an external electronic device. The electronic device 100 may include multiple connector holes, and some of the multiple connector holes may function as a connector hole for transmitting or receiving an audio signal to or from the external electronic device. The connector hole 143 is illustrated as being disposed through the third sidewall 123c, but the disclosure is not limited thereto. For example, the connector hole 143 or an additional connector hole may be disposed through the first sidewall 123a or the second sidewall 123b.

The audio modules 145a, 145b, 147a, and 147b may be embodied as speaker holes 145a and 145b or microphone holes 147a and 147b. One of the speaker holes 145a and 145b may be provided as a receiver hole for a voice call, and the other may be provided as an external speaker hole. The microphone holes 147a and 147b may have a microphone disposed inside thereof to acquire an external sound, and may have multiple microphones arranged to sense a sound direction. The speaker holes 145a and 145b and the microphone holes 147a and 147b may be implemented as one hole, or a speaker (e.g., a Piezo speaker) may be included without the speaker holes 145a and 145b. The speaker hole 145b may be disposed through the first structure 101 to be utilized as a receiver hole for a voice call, and the speaker hole 145a or the microphone holes 147a and 147b may be disposed through the second structure 102 (e.g., one of the sidewalls 123a, 123b, and 123c).

The camera module 149 may be provided at the second structure 102 and may capture an image of a subject in the direction opposite to that of the first area A1 of the display 103. The electronic device 100 may include multiple camera modules. For example, the electronic device 100 may include a wide-angle camera, a telephoto camera, or a close-up camera, and may include an infrared projector and/or an infrared receiver so as to measure the distance from a subject. The camera module 149 may include one or multiple lenses, an image sensor, and/or an image signal processor. The electronic device 100 may further include a camera module (e.g., a front camera) for capturing an image of a subject in the direction identical to that of the first area A1 of the display 103. For example, the front camera may be disposed around the first area A1 or in an area overlapping the display 103, and when the front camera is disposed in the area overlapping the display 103, the front camera may capture an image of a subject projected through the display 103.

The indicator of the electronic device 100 may be disposed on the first structure 101 or the second structure 102, and may include a light emitting diode (LED) to provide state information of the electronic device 100 as a visual signal. The sensor module of the electronic device 100 may generate an electrical signal or data value corresponding to an internal operation state of the electronic device 100 or an external environmental state. The sensor module may include, for example, a proximity sensor, a fingerprint sensor, or a biometric sensor (e.g., an iris/face recognition sensor or an HRM sensor). The sensor module may further include, for example, at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illumination sensor.

Figure 3:
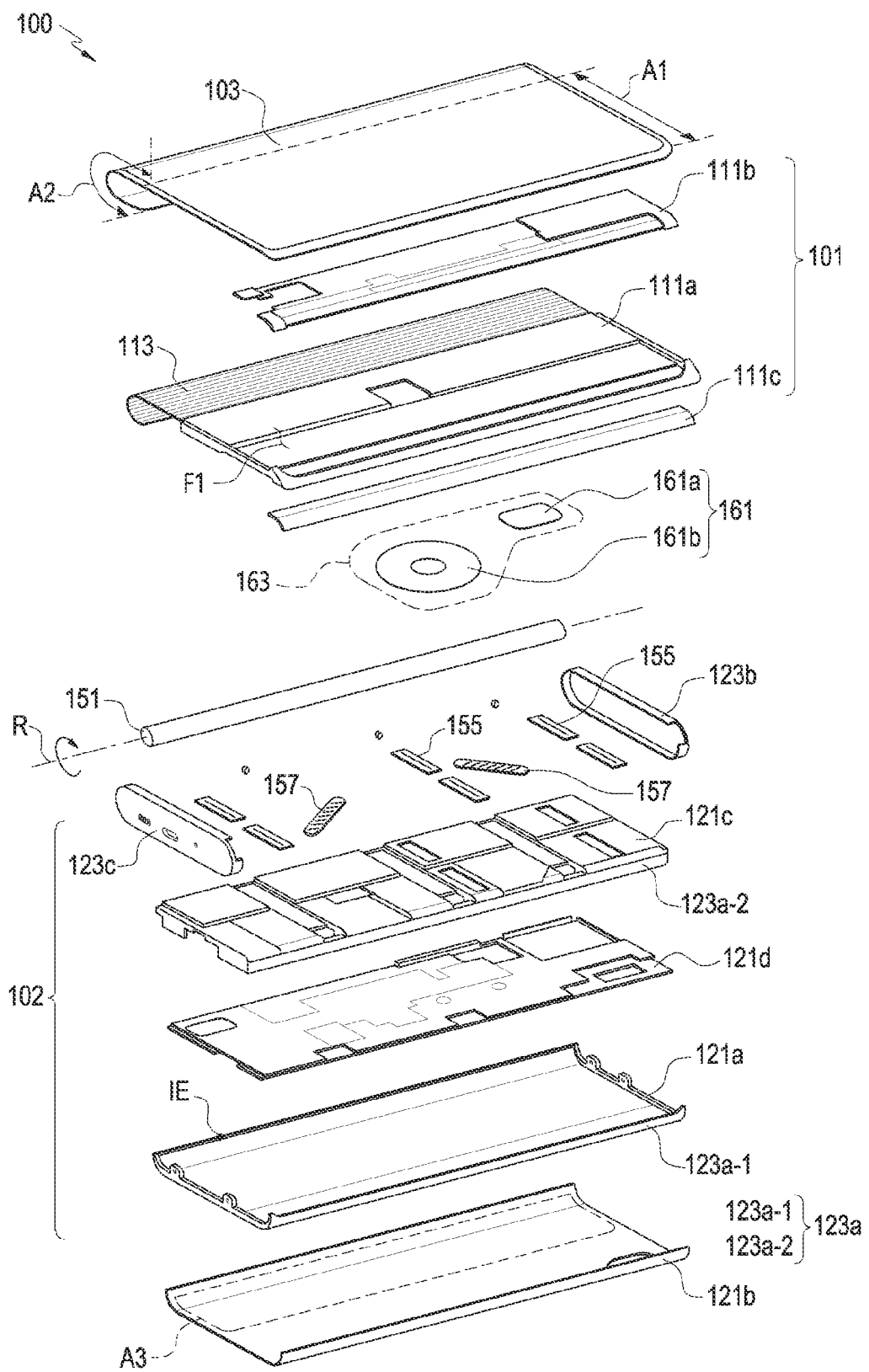
FIG. 3 is a diagram illustrating an exploded perspective view of an electronic device, according to an embodiment.
Figure 4:
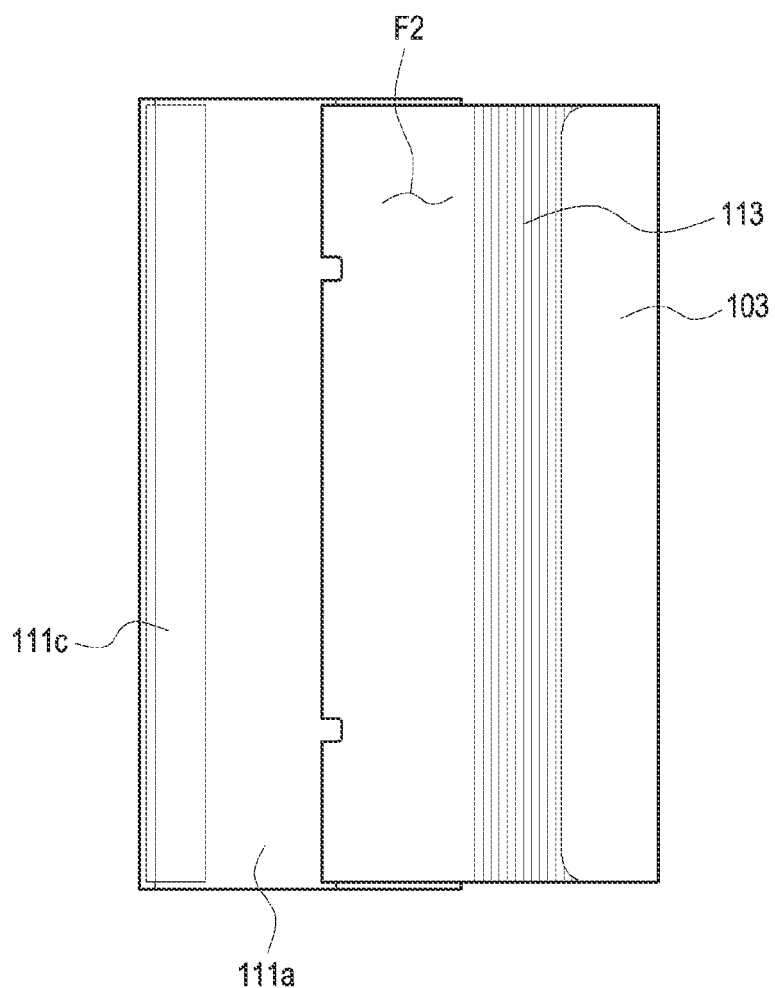
FIG. 4 is a diagram illustrating a bottom view of an electronic device in a state in which a flexible display is mounted, according to an embodiment.

FIG. 3 is a diagram illustrating an exploded perspective view of an electronic device, according to an embodiment. FIG. 4 is a diagram illustrating a bottom view of an electronic device illustrating a state in which a flexible display is mounted, according to an embodiment.

Referring to FIGS. 3 and 4, the electronic device 100 includes the first structure 101, the second structure 102 (e.g., a housing), the display 103 (e.g., a flexible display), a guide member (e.g., the roller 151), a multi-joint hinge structure 113, and at least one antenna structure 161. A part (e.g., a second area A2) of the display 103 may be received in the second structure 102 while being guided by the roller 151.

The first structure 101 includes the first plate 111a (e.g., a slide plate), a first bracket 111b mounted on the first plate 111a, and a second bracket 111c. The first structure 101, for example, the first plate 111a, the first bracket 111b, and the second bracket 111c may be made of a metallic material and/or a nonmetallic (e.g., polymer) material. The first plate 111a is mounted on the second structure 102 (e.g., a housing) and rectilinearly reciprocates in one direction (e.g., arrow ( ) in FIG. 1) while being guided by the second structure 102. The first bracket 111b is coupled to the first plate 111a to form a first surface F1 of the first structure 101 together with the first plate 111a. The first area A1 of the display 103 is substantially mounted on the first surface F1 and is maintained in a flat plate shape. The second bracket 111c is coupled to the first plate 111a to form a second surface F2 of the first structure 101 together with the first plate 111a. The first bracket 111b and/or the second bracket 111c may be integrally formed with the first plate 111a. This may be designed in consideration of an assembly structure or a manufacturing process of a manufactured product. The first structure 101 or the first plate 111a is coupled to the second structure 102 to be rollable or slidable with respect to the second structure 102.

The multi-joint hinge structure 113 may include multiple rods which rectilinearly extend and are arranged in parallel to a rotation axis R of the roller 151. The multiple rods may be arranged along a direction that is perpendicular to the rotation axis R, for example, a direction in which the first structure 101 is rollable or slidable. The multi-joint hinge structure 113 may be connected to one end of the first structure 101, and may move with respect to the second structure 102 according to a rolling movement or a sliding movement of the first structure 101. For example, in the closed state of FIG. 1, the multi-joint hinge structure 113 is substantially received in the second structure 102, and in the open state of FIG. 2, the multi-joint hinge structure 113 is extracted to the outside of the second structure 102. Even in the closed state of the electronic device 100, a part of the multi-joint hinge structure 113 may not be received in the second structure 102. For example, even in the closed state of the electronic device 100, a part of the multi-joint hinge structure 113 may be positioned outside of the second structure 102 to correspond to the roller 151.

Rods of the multi-joint hinge structure 113 may rotate around other adjacent rods while maintaining a state in which the rods are in parallel to the other adjacent rods. According to a rolling movement or a sliding movement of the first structure 101, the multi-joint hinge structure 113 forms a curved surface in a part facing the roller 151, and forms a flat surface in a part not facing the roller 151. The second area A2 of the display 103 is mounted on or supported by the multi-joint hinge structure 113, and is exposed to the outside of the second structure 102 together with the first area A1 in the open state illustrated in FIG. 2. In a state in which the second area A2 is exposed to the outside of the second structure 102, the multi-joint hinge structure 113 may substantially form a flat surface and support or maintain the second area A2 in a flat state.

The second structure 102 (e.g., a housing) includes the second plate 121a (e.g., a rear case), a printed circuit board, the rear plate 121b, a third plate 121c (e.g., a front case), and a support member 121d. The second plate 121a is disposed to be oriented opposite to the first surface F1 of the first plate 111a, and substantially provides an exterior shape of the second structure 102 or the electronic device 100. The second structure 102 includes the first sidewall 123a extending from the second plate 121a, the second sidewall 123b extending from the second plate 121a and formed to be substantially perpendicular to the first sidewall 123a, and the third sidewall 123c which extends from the second plate 121a, is substantially perpendicular to the first sidewall 123a, and is parallel to the second sidewall 123b. The second sidewall 123b and the third sidewall 123c are illustrated as components that are separate from the second plate 121a so as to be mounted to or assembled with the second plate 121a, but the second sidewall 123b and the third sidewall 123c may be integrally formed with the second plate 121a.

The rear plate 121b may be coupled to an outer surface of the second plate 121a, and may be integrally manufactured with the second plate 121a. The second plate 121a may be made of a metallic or polymer material, and the rear plate 121b may be made of a metallic, glass, synthetic resin, or ceramic material to provide a decorating effect to the exterior of the electronic device 100. At least a part (e.g., an auxiliary display area A3) of the second plate 121a and/or the rear plate 121b may be made of a light-permeable material. In a state in which a part (e.g., the second area A2) of the display 103 is received in the second structure 102, at least a part of the second area A2 may be positioned to correspond to the auxiliary display area A3. For example, the display 103 may output, while being received in the second structure 102, a screen by using at least a part of the second area A2, and a user may recognize the output screen through the auxiliary display area A3.

The third plate 121c may be made of a metallic or polymer material, and is coupled to the second plate 121a (e.g., the rear case), the first sidewall 123a, the second sidewall 123b, and the third sidewall 123c so as to form an inner space of the second structure 102. The third plate 121c may be referred to as a "front case", and the first structure 101, for example, the first plate 111a, may substantially roll or slide while facing the third plate 121c. The first sidewall 123a may be formed in a combination of a first sidewall part 123a-1 extending from the second plate 121a and a second sidewall part 123a-2 formed at the edge of one side of the third plate 121c. The first sidewall part 123a-1 may be formed to cover the edge of one side of the third plate 121c, for example, the second sidewall part 123a-2, and in this case, the first sidewall part 123a-1 itself may form the first sidewall 123a.

The support member 121d is disposed in a space between the second plate 121a and the second plate 121c, and has a flat plate shape made of a metallic or polymer material. The support member 121d may provide an electromagnetic shield structure in the inner space of the second structure 102, and may improve a mechanical strength of the second structure 102. When the multi-joint hinge structure 113 and/or a partial area (e.g., the second area A2) of the display 103 is received in the second structure 102, the multi-joint hinge structure 113 and/or a partial area (e.g., the second area A2) of the display 103 may be positioned in a space between the second plate 121a and the support member 121d.

The printed circuit board may be positioned in a space between the third plate 121c and the support member 121d. For example, the printed circuit board may be received in a space separated by the support member 121d from the space in which the multi-joint hinge structure 113 and/or the partial area of the display 103 is received in the second structure 102. A processor, a memory, and/or an interface may be mounted on the printed circuit board. The processor may include one or more of a central processing unit (CPU), an application processor (AP), a graphic processing unit (GPU), an image signal processor (ISP), a sensor hub processor, and a communication processor.

The memory may include, for example, a volatile memory and/or a non-volatile memory.

The interface may include, for example, a high definition multimedia interface (HDMI), a USB interface, a secure digital (SD) card interface, and/or an audio interface. For example, the interface may electrically or physically connect the electronic device 100 to an external device, and may include a USB connector, an SD card/multimediacard (MMC) connector, or an audio connector.

The display 103 is a flexible display based on an organic light emitting diode, and at least a part of the display 103 may be transformed into a curved shape while most of the display 103 is maintained in a planar shape. The first area A1 of the display 103 may be mounted on or attached to the first surface F1 of the first structure 101 and may substantially be maintained in a flat plate shape. The second area A2 may extend from the first area A1 and may be attached to or supported by the multi-joint hinge structure 113. For example, the second area A2 may extend along the direction of rolling movement or sliding movement of the first structure 101, and may be received in the second structure 102 together with the multi-joint hinge structure 113. At least part of the second area A2 may be transformed into a curved shape according to a transformation of the multi-joint hinge structure 113.

As the first structure 101 rolls or slides on the second structure 102, an area of the display 103 exposed to the outside thereof may vary. The electronic device 100 (e.g., a processor) may change an active area of the display 103 according to the area of the display 103 exposed to the outside thereof. For example, in the open state or in a state between the closed state and the open state, the electronic device 100 may activate an area exposed to the outside of the second structure 102 among all areas of the display 103. In the closed state, the electronic device 100 may activate the first area A1 of the display 103 and deactivate the second area A2 of the display 103. In the closed state, when there is no user input for a predetermined time (e.g., 30 seconds or 2 minutes), the electronic device 100 may deactivate all areas of the display 103. In a state in which all areas of the display 103 are deactivated, the electronic device 100 may activate a partial area of the display 103 to provide visual information through the auxiliary display area A3, as necessary (e.g., a notification according to a user setting or a notification of a missed call/message reception).

In the opened state illustrated in FIG. 2, all areas (e.g., the first area A1 and the second area A2) of the display 103 are substantially exposed to the outside, and the first area A1 and the second area A2 are arranged to form a flat surface. Even in the opened state, a part (e.g., one end) of the second area A2 is positioned to correspond to the roller 151, and this part of the second area A2 is maintained in a curved shape. For example, even though various embodiments of the disclosure describe that "in the open state, the second area A2 is disposed to form a flat surface", a part of the second area A2 may be maintained in a curved shape. Similarly, even though various embodiments describe that "in the closed state, the multi-joint hinge structure 113 and/or the second area A2 are received in the second structure 102", a part the multi-joint hinge structure 113 and/or the second area A2 may be positioned outside the second structure 102.

The guide member, for example, the roller 151, is rollably mounted with respect to the second structure 102 in the position adjacent to the edge of one end of the second structure 102 (e.g., the second plate 121a). For example, the roller 151 is disposed adjacent to the edge, as indicated by "IE", of the second plate 121a parallel to the first sidewall 123a. Another sidewall extends from the edge of the second plate 121a adjacent to the roller 151. The sidewall adjacent to the roller 151 is substantially parallel to the first sidewall 123a. The sidewall of the second structure 102, which is adjacent to the roller 151, may be formed of a light-permeable material, and a part of the second area A2 may penetrate, while being received in the second structure 102, a part of the second structure 102, so as to provide visual information.

One end of the roller 151 is rotatably coupled to the second sidewall 123b, and the other end of the roller 151 is rotatably coupled to the third sidewall 123c. For example, the roller 151 is mounted to the second structure 102, and rotates with respect to the rotation axis R perpendicular to the direction of the roiling movement or the sliding movement of the first structure 101 (e.g., the direction of arrow ① in FIG. 1 or FIG. 2). The rotation axis R is substantially parallel to the first sidewall 123a, and is positioned away from the first sidewall 123a, for example, at the edge of one side of the second plate 121a. A gap between the outer-circumferential surface of the roller 151 and the inner surface of the edge of the second plate 121a may form an entrance through the multi-joint hinge structure 113, or the display 103 enters inside the second structure 102.

When the display 103 is transformed into a curved shape, the roller 151 may maintain the curvature radius of the display 103 at a predetermined degree so as to prevent excessive transformation of the display 103. "Excessive transformation" may refer to a transformation having an excessively small curvature radius, which may cause damage to a signal line or a pixel included in the display 103. For example, the display 103 may move or may be transformed while being guided by the roller 151, and may be protected from damage due to the excessive transformation. While the multi-joint hinge structure 113 or the display 103 is inserted into or extracted from the second structure 102, the roller 151 may rotate. For example, an operation of inserting or extracting the multi-joint hinge structure 113 (or the display 103) into or from the second structure 102 may be facilitated by restraining or preventing friction between the second structure 102 and the multi-joint hinge structure 113 (e.g., the display 103).

The electronic device 100 further includes include a guide rail 155 and an actuating member 157. The guide rail 155 is mounted to the second structure 102, for example, the third plate 121c so as to guide a rolling movement or a sliding movement of the first structure 101 (e.g., the first plate 111a or a slide plate). The actuating member 157 may include a spring or a spring module which provides an elastic force applied in a direction in which opposite ends of the actuating member move away from each other. One end of the actuating member 157 is rotatably supported by the second structure 102, and the other end is rotatably supported by the first structure 101.

When the first structure 101 rolls or slides, at a point between the closed state and the open state, opposite ends of the actuating member 157 may be positioned to be closest to each other (hereinafter, referred to as a "closest point"). For example, in a section between the closest point and the closed state, the actuating member 157 may provide an elastic force to the first structure 101 applied in the direction toward the closed state, and in a section between the closest point to the open state, the actuating member 157 may provide an elastic member to the first structure 101 applied in the direction toward the open state.

The antenna structure 161 is disposed on at least one of the first structure 101 and the second structure 102. The antenna structure 161 may include a loop antenna including electrically conductive bodies, for example, electrically conductive lines arranged on a flat surface or a flat plate. The antenna structure 161 may include a patch antenna, a monopole antenna, a dipole antenna, or an inverted-F antenna, according to deployment or a shape of an electrically conductive body. The antenna structure may be configured to perform, for example, at least one type of communication from among near-field communication (NFC), wireless power reception or transmission, and magnetic secure transmission (MST). However, wireless communication performed though the antenna structure 161 is not limited thereto. For example, the electronic device 100 may access a mobile or cellular communication network-, a local area network (LAN), a wireless local area network (WLAN), a wide area network (WAN), the Internet, and a small area network (SAN) by using the antenna structure 161. The antenna structure 161 includes a first antenna 161*a* for the MST and/or the NFC, and a second antenna 161*b* for the NFC and/or wireless charging (wireless power transmission). The first antenna 161*a* may be configured to perform the NFC and/or wireless charging, and the second antenna 161*b* may be utilized for the MST.

Figure 5:
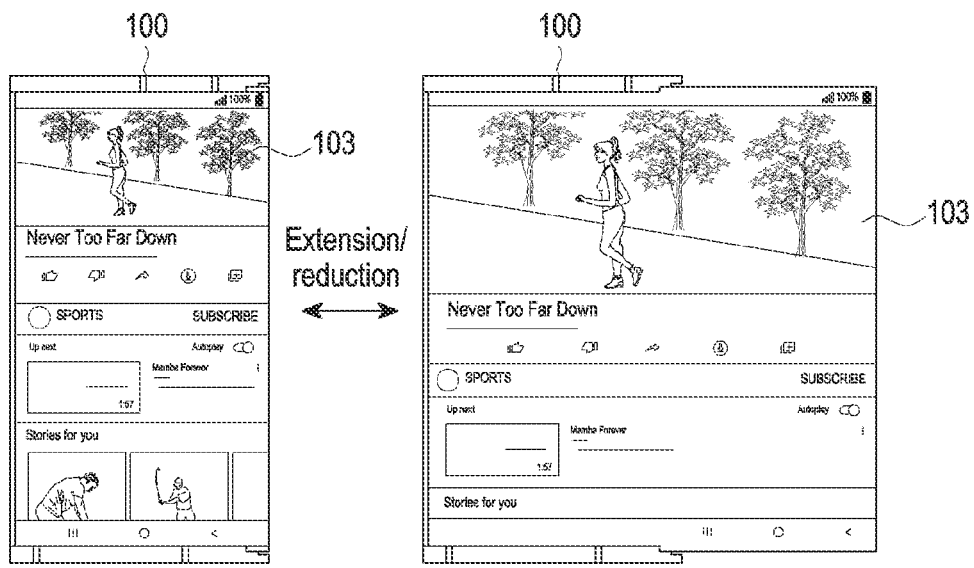
FIG. 5 is a diagram illustrating a method for displaying a screen by an electronic device as a flexible display included in the electronic device is extended or reduced by rolling movement or sliding movement, according to an embodiment.

FIG. 5 is a diagram illustrating a method for displaying a screen by an electronic device as a flexible display included in the electronic device is extended or reduced by a rolling movement or a sliding movement, according to an embodiment.

Referring to FIG. 5, the electronic device 100 may include a processor and the flexible display 103.

The processor may control the overall operations of the electronic device 100. In addition, the processor may be disposed in the housing of the electronic device 100. An operation of the electronic device 100, as described below, may be controlled by the processor.

The electronic device 100 displays a first screen in a state in which the flexible display 103 is not extended, or a state in which the flexible display 103 is reduced. For example, the electronic device 100 displays the first screen in all areas of the flexible display 103 in a state in which the flexible display 103 is not extended. The first screen includes an application execution screen or window, a home screen, a navigation bar, and a state bar.

When the flexible display 103 is completely extended, the electronic device 100 displays a screen corresponding to the first screen. For example, in a state in which the flexible display 103 is extended, the screen corresponding to the first screen is displayed on all areas of the flexible display 103. The screen corresponding to the first screen is obtained by changing (increasing and/or enhancing) the size and/or the resolution of the first screen.

While the flexible display 103 is extended or reduced by a sliding movement, the electronic device 100 displays a second screen corresponding to the first screen. For example, the second screen is obtained by changing at least one of the size, the position, the filter processing, or the brightness of the first screen as the flexible display 103 is extended or reduced. The electronic device 100 may gradually increase the size of the second screen as the flexible display is extended. The electronic device 100 may gradually move the position of the second screen along the direction of the sliding movement as the flexible display is extended. In addition, the electronic device 100 may gradually increase the brightness of the second screen as the flexible display is extended. For example, the electronic device 100 may apply a fade-in effect to the second screen as the flexible display is extended.

The electronic device 100 can inform a user of the degree of extension or reduction of the flexible display 103 caused by the sliding movement of the flexible display 103. However, screen redrawing may be performed for displaying of the second screen. While performing the screen redrawing, power is consumed that was saved in a battery.

Operations of the electronic device 100 are described focusing the flexible display 103 being extended, but the technical idea of the disclosure is not limited thereto. For example, an operation in which the flexible display 103 is reduced may be performed as the reverse of the operation in which the flexible display 103 is extended.

When rolling movement or sliding movement of the flexible display is identified, the electronic device 100 may acquire device state information. For example, the device state information may include at least one of information on a power state of a battery included in the electronic device 100, information indicating whether an adaptor for supplying power from outside is connected, user setting information, and information on the temperature of the electronic device 100 or at least one component of the electronic device 100.

The electronic device 100 may determine one or more screen redrawing methods or operations by using the device state information. The electronic device 100 may display, in real time, a screen corresponding to a rolling movement or a sliding movement of the flexible device according to the determined screen redrawing method or operation. For example, the screen redrawing methods or operations may include three screen redrawing methods or operations set forth below. However, the technical idea of the disclosure is not limited thereto.

Figure 6:
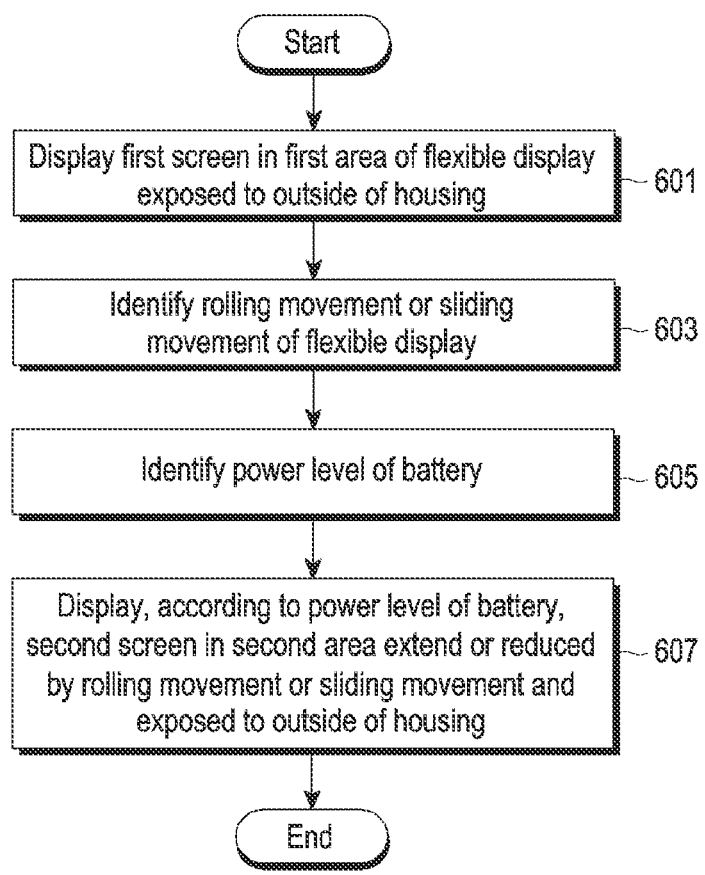
FIG. 6 is a flow chart illustrating a method for displaying, by an electronic device including a flexible display, a screen in an area extended or reduced by rolling movement or sliding movement of the flexible display, according to a power state of a battery, according to an embodiment.

FIG. 6 is a flow chart illustrating a method for displaying, by an electronic device including a flexible display, a screen in an area extended or reduced by a rolling movement or a sliding movement of the flexible display, according to a power state of a battery, according to an embodiment.

601 to 607 of FIG. 6 may be performed by at least one component of the electronic device 100.

At 601, the electronic device 100 displays a first screen in a first area the flexible display 103 exposed to the outside of the housing of the electronic device 100. For example, the first area of the flexible display 103 may correspond to a display area of the flexible display 103 exposed to the outside of the housing of the electronic device 100 before a rolling movement or a sliding movement of the flexible display 103 is identified. The first area may include a display area in which the flexible display is in a completely unfolded state or a display area in which the flexible display is in a completely folded (or reduced) state. The first screen may include an application execution screen or window, a home screen, a standby screen, a locked screen, a navigation bar, and/or a state bar.

At 603, the electronic device 100 identifies a rolling movement or a sliding movement of the flexible display 103. For example, the electronic device 100 may identify whether the rolling movement or the sliding movement is performed by acquiring a signal of the rolling movement or the sliding movement, through a sensor included in the electronic device 100.

The rolling movement or the sliding movement of the flexible display 103 may include movement of extending or reducing a display area, or a structure body including the display area, of the flexible display 103.

At 605, the electronic device 100 identifies a power state of a battery included in the electronic device 100 when the rolling movement or the sliding movement is identified. For example, the power state of the battery may refer to the amount of power with respect to a fully charged state of a battery. The electronic device 100 may periodically identify the power state of the battery, regardless of the identification of the rolling movement or the sliding movement.

At operation 607, the electronic device 100 displays a second screen in a second area of the flexible display 103, which is extended or reduced by the rolling movement or the sliding movement and is exposed to the outside of the housing, according to the power state of the battery. For example, the second area of the flexible display 103 may be a display area of the flexible display 103, which is exposed to the outside of the housing, as the first area is extended or reduced by the sliding movement. The size of the second area of the flexible display 103 may gradually increase or decrease as the flexible display is extended. The second screen may be a screen obtained by changing at least one of the size and the position of the first screen as the flexible display 103 is extended or reduced. The electronic device 100 may gradually increase the size of the second screen as the flexible display is extended. In addition, the electronic device 100 may gradually move the position of the second screen along the direction of the rolling movement or the sliding movement as the flexible display 103 is extended.

The electronic device 100 may perform screen redrawing for displaying of the second screen, according to the power state the battery included in the electronic device 100, which is described in greater detail below with respect to FIG. 7.

Figure 7:
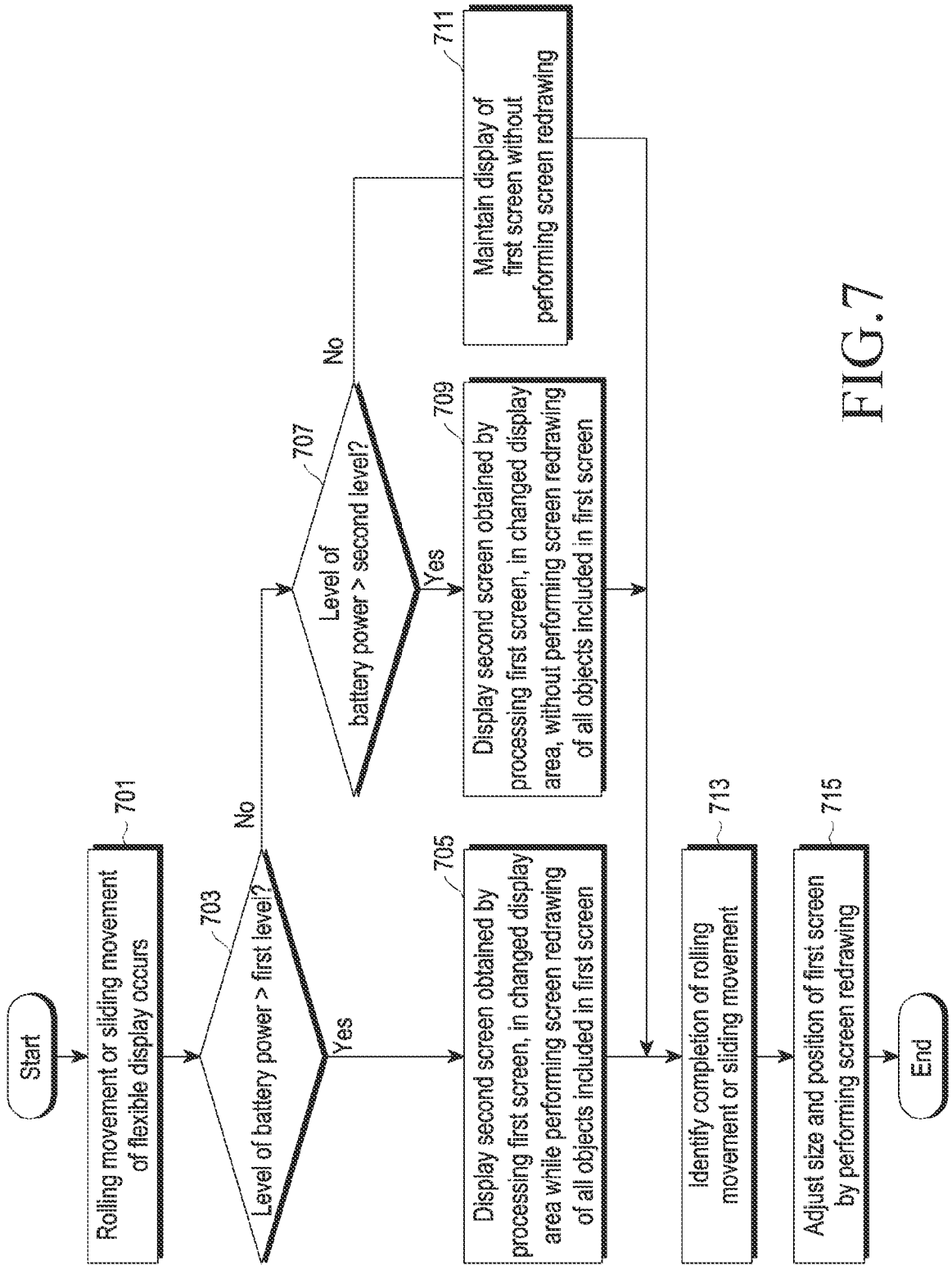
FIG. 7 is a flow chart illustrating a method for displaying, by an electronic device including a flexible display, a screen in an area extended or reduced by rolling movement or sliding movement of the flexible device, according to a power state of a battery, according to an embodiment.

FIG. 7 is a flow chart illustrating a method for displaying, by an electronic device including a flexible display, a screen in an area extended or reduced by a rolling movement or a sliding movement of the flexible device, according to a power state of a battery, according to an embodiment.

At 701, the electronic device 100 identifies that a rolling movement or a sliding movement of the flexible display 103 has occurred while a first screen is displayed on the flexible display 103.

701 to 705 of FIG. 7 may be performed by at least one component of the electronic device 100.

The electronic device 100 may acquire information indicating a power state of a battery included in the electronic device 100 in response to the identification of the rolling movement or the sliding movement.

At 703, the electronic device 100 identifies whether a power level of the battery is higher than a first level. For example, the first level corresponds to a power level indicating a power state that is sufficient to perform a normal operation. When it is assumed that a fully charged power of the battery is 100%, the first level may refer to a power state having a 15% power amount. The power state indicated by the first level may be changed by a processor or a user.

If the power level of the battery is higher than the first level, while the rolling movement or the sliding movement occurs, the electronic device 100 displays, at 705 a second screen obtained by processing a first screen in a changed display area while performing screen redrawing of objects and/or all applications included in the first screen. For example, the second screen may correspond to a screen obtained by changing at least one of the size, the position, the filter processing, and the brightness (for example, fade in/fade out) of the first screen. When the size of the flexible display 103 gradually changes by the rolling movement or the sliding movement, the electronic device 100 may gradually change the size and the position of the first screen so that the first screen is matched to the changed size of the flexible display 103. In addition, the electronic device 100 may perform screen redrawing according to the gradual change in the size and the position of the first screen. For example, in order to perform a re-sizing operation in which the size and the position of the first screen are changed, the electronic device 100 may perform screen redrawing for all applications related to the first screen according to a period of a signal of a sensor for detecting the rolling movement or the sliding movement. The electronic device 100 may perform the re-sizing operation 90 times per second, and may perform screen redrawing for all applications related to the first screen 90 times per second.

In a state in which power is supplied by an external device (for example, a wired adaptor or a wireless power transmitter) and the rolling movement or the sliding movement occurs, the electronic device 100 may change at least one of the size, the position, the filter processing, and the brightness of the first screen while performing screen redrawing of objects and/or all applications included in the first screen.

If the power level of the battery is not higher than the first level, the electronic device 100 identifies, at 707, whether the power level of the battery is higher than a second level. For example, the second level may correspond to a power level indicating that the electronic device 100 needs to be managed in a power saving mode. For example, when it is assumed that the power level of a fully charged battery is 100%, the second level may refer to a power level having a 5% power amount. The second level may be changed by a processor or a user.

If the power level of the battery is higher than the second level, according to the rolling movement or the sliding movement, the electronic device 100 displays, at 709, a second screen obtained by processing the first screen, in a changed display area, without performing screen redrawing including a layout change of applications and/or objects (for example, a state bar and a navigation bar) included in the first screen. For example, the second screen may correspond to a screen obtained by changing at least one of the size, the position, the filter processing, and the brightness of the first screen. The electronic device 100 may gradually increase (or decrease) the size of the second screen as the flexible display 103 is extended (or reduced). In addition, the electronic device 100 may gradually move the position of the second screen in the direction of the rolling movement or the sliding movement as the flexible display 103 is extended (or reduced). Alternatively, the electronic device 100 may move the position of the second screen in the direction of the rolling movement or the sliding movement while gradually extending (or reducing) the size of the second screen as the flexible display 103 is extended (or reduced).

If the power level of the battery is not higher than the second level, the electronic device 100 maintains, at 711, a display of the first screen without performing screen redrawing according to the rolling movement or the sliding movement. For example, the electronic device 100 does not change the size and the position of the first screen even though the rolling movement or the sliding movement is identified.

At 713, the electronic device 100 identifies whether the sliding movement has been completed. For example, when the flexible display 103 is completely extended or reduced, the electronic device 100 may determine that the rolling movement or the sliding movement of the flexible display 103 has been completed. Alternatively, when the rolling movement or the sliding movement of the flexible display 103 is not identified for a pre-configured time, the electronic device 100 may determine that the rolling movement or the sliding movement of the flexible display 103 has been completed.

When it is identified that the rolling movement or the sliding movement has been completed, the electronic device

100 may performs screen redrawing of applications related to the first screen to adjust the size and the position of the first screen or the second screen, at 715. For example, the electronic device 100 may display a screen corresponding to the first screen in an entire display areas of the flexible display 103 exposed to the outside of the housing. In this case, the electronic device 100 may expand or reduce the first screen and also change a screen resolution.

Figure 8:
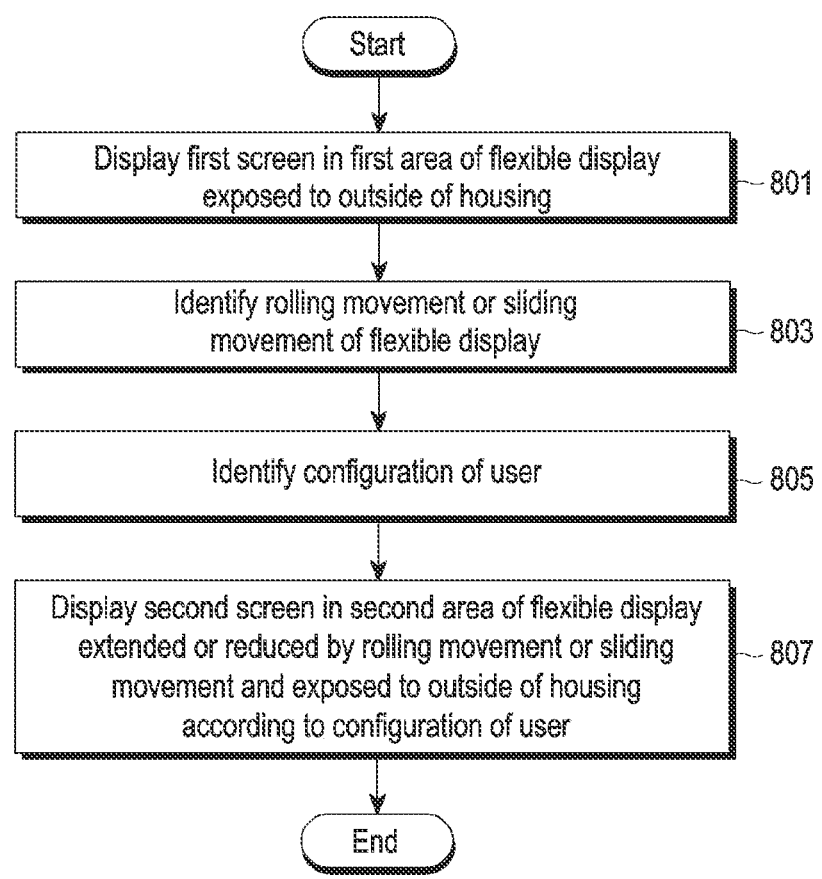
FIG. 8 is a flow chart illustrating a method for displaying, by an electronic device including a flexible display, a screen in an area extended or reduced by rolling movement or sliding movement of the flexible display, according to a setting of a user, according to an embodiment.

FIG. 8 is a flow chart illustrating a method for displaying, by an electronic device including a flexible display, a screen in an area extended or reduced by rolling movement or sliding movement of the flexible display, according to a setting of a user, according to an embodiment.

801 to 807 of FIG. 8 may be performed by at least one component of the electronic device 100.

Referring to FIG. 8, at 801, the electronic device 100 displays a first screen in a first area of the flexible device 103. For example, the first area of the flexible device 103 may be a display area exposed to the outside of housing before a rolling movement or a sliding movement of the flexible display 103 is identified. The first screen may include an application execution screen or window, a home screen, a standby screen, a locked screen, a navigation bar, and/or a state bar.

At 803, the electronic device 100 identifies a rolling movement or a sliding movement of the flexible device 103. For example, the electronic device 100 may identify whether the flexible display 103 rolls or slides by acquiring a signal by the rolling movement or the sliding movement through a sensor included in the electronic device 100.

At 805, the electronic device 100 identifies a setting of a user when the rolling movement or the sliding movement is identified. For example, the setting of the user may be information indicating how to configure a first screen while the rolling movement or the sliding movement occurs. The information on the setting of the user may be configured by the user or may be automatically configured by a processor.

At 807, the electronic device 100 displays a second screen in a second area of the flexible display 103. The second area of the flexible display 103 is exposed to the outside of the housing is extended or reduced by the rolling movement or the sliding movement of the flexible display 103, according to the setting of the user. For example, the second area of the flexible display 103 may be a display area of the flexible display 103, the display area of flexible display 103 being exposed to the outside the housing is extended or reduced by the sliding movement of the flexible display 103. The second screen may correspond to a screen obtained by changing at least one of the size and the position of the first screen as the flexible display 103 is extended or reduced. For example, as the flexible display is extended, the electronic device 100 may gradually increase the size of the second screen by using the information on the setting of the user. In addition, the electronic device 100 may gradually move the position of the second screen in the direction of the rolling movement or the sliding movement as the flexible display is extended.

The electronic device 100 may determine whether to perform screen redrawing for displaying the second screen, according to the information on the setting of the user. For example, the electronic device 100 may set the second screen to be displayed always with screen redrawing. Alternatively, in displaying the second screen, the electronic device 100 may set screen redrawing to be performed only when a condition is met. Alternatively, the electronic device 100 may set the second screen to be displayed without screen redrawing at any time.

Figure 9:
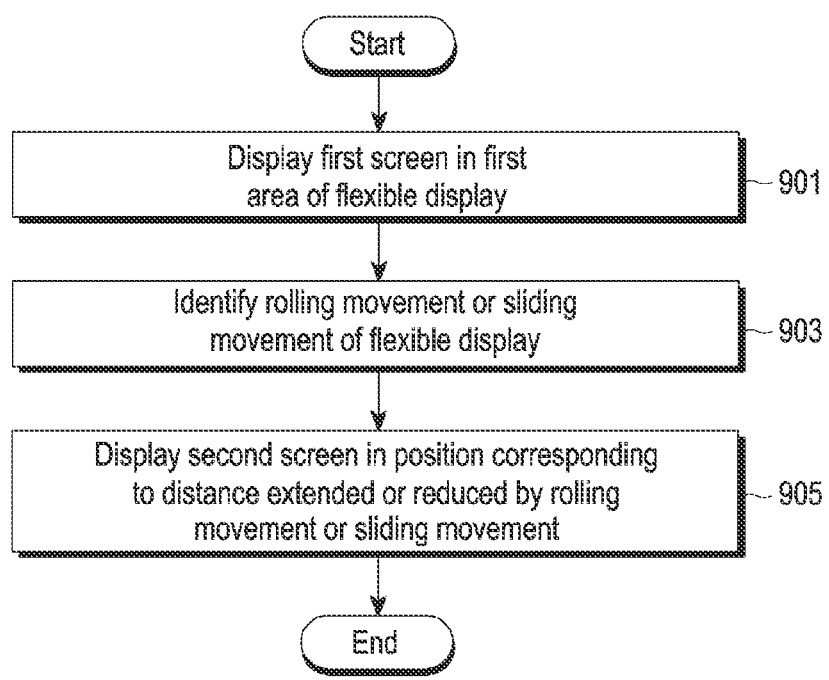
FIG. 9 is a flow chart illustrating a method for displaying, by an electronic device including a flexible device, a screen in an area extended or reduced by rolling movement or sliding movement of the flexible display, according to an embodiment.

FIG. 9 is a flow chart illustrating a method for displaying, by an electronic device including a flexible device, a screen in an area extended or reduced by rolling movement or sliding movement of the flexible display, according to an embodiment.

901 to 905 of FIG. 9 may be performed by at least one component of the electronic device 100.

At 901, the electronic device 100 displays a first screen in a first area of the flexible display 103. For example, the first area may correspond to a display area of the flexible display 103 exposed to the outside of housing before a rolling movement or a sliding movement of the flexible display 103.

At 903, the electronic device 100 identifies a rolling movement or a sliding movement of the flexible display 103.

At 905, the electronic device 100 displays a second screen in a position corresponding to a distance extended or reduced by the rolling movement or the sliding movement of the flexible display 103. For example, in a state in which the first screen is displayed, the electronic device 100 may identify, in real time, the distance by which the flexible display 103 is moved by the rolling movement or the sliding movement. The electronic device 100 may gradually move the position of the second screen in the direction of the rolling movement or the sliding movement according to the distance by which the flexible display 103 is moved by the rolling movement or the sliding movement.

Figure 10:
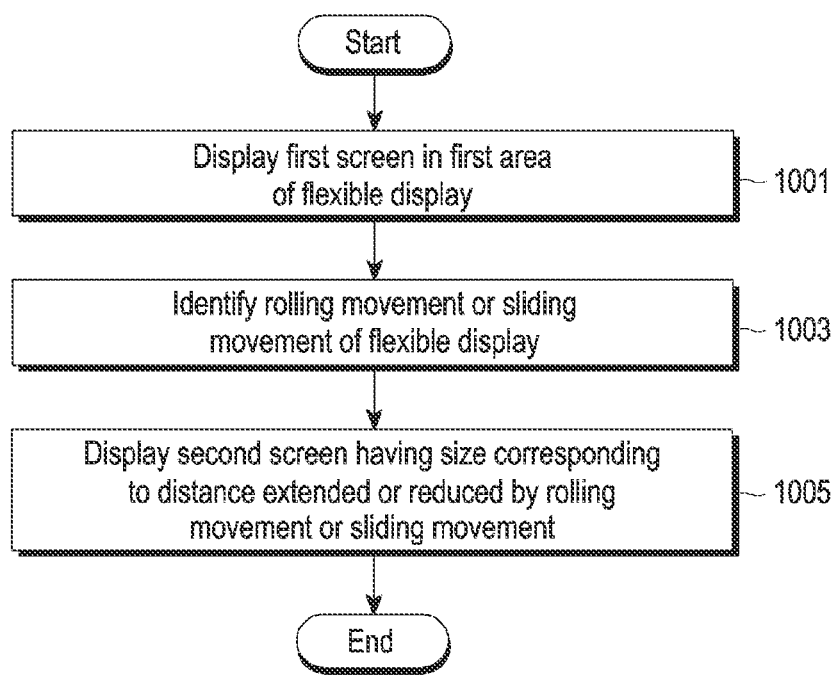
FIG. 10 is a flow chart illustrating a method for displaying, by an electronic device including a flexible display, a screen in an area extended or reduced by rolling movement or sliding movement of the flexible display, according to an embodiment.

FIG. 10 is a flow chart illustrating a method for displaying, by an electronic device including a flexible display, a screen in an area extended or reduced by rolling movement or sliding movement of the flexible display, according to an embodiment.

1001 to 1005 of FIG. 10 may be performed by at least one component of the electronic device 100.

At 1001, the electronic device 100 displays a first screen in a first area of the flexible display 103. For example, the first area may be a display area of the flexible display 103 exposed to the outside of the housing before a rolling movement or a sliding movement of the flexible display 103.

At 1003, the electronic device 100 identifies a rolling movement or a sliding movement of the flexible display 103.

At 1005, the electronic device 100 displays a second screen having a size corresponding to a distance by which the flexible display 103 is extended or reduced by the rolling movement or the sliding movement. For example, in a state in which the first screen is displayed, the electronic device 100 may identify, in real time, the distance by which the flexible display 103 is moved by the rolling movement or the sliding movement. The electronic device 100 may gradually increase (or decrease) the size of the second screen according to the distance by which the flexible display 103 is moved by the rolling movement or the sliding movement.

The electronic device 100 may display the second screen by using a combination of the methods described in FIGS. 9 and 10. For example, the electronic device 100 may expand the second screen according to a size corresponding to the distance by which the flexible display 103 is extended or reduced by the rolling movement or the sliding movement, and may display the expanded second screen in the position corresponding to the distance described above.

Figure 11A:
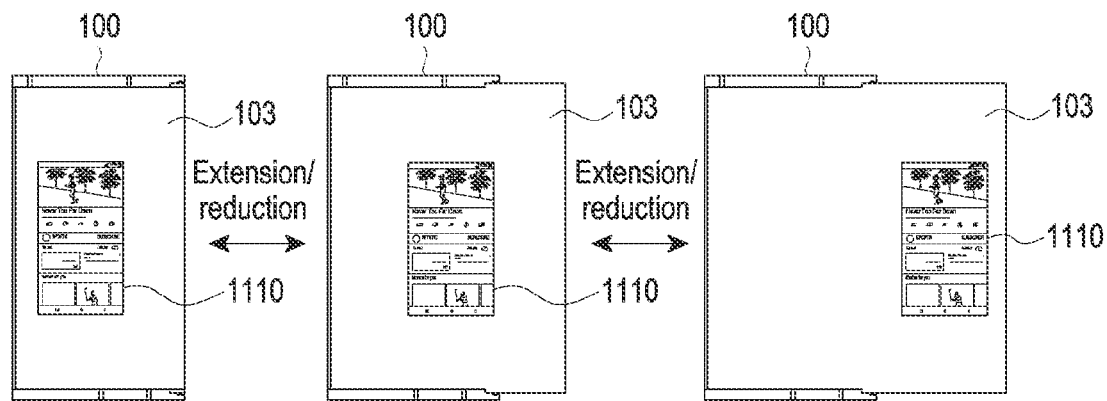
FIGS. 11A and 11B are diagrams illustrating a method for displaying, by an electronic device including a flexible display, a screen in an area extended or reduced by rolling movement or sliding movement of the flexible display, according to embodiments.
Figure 11B:
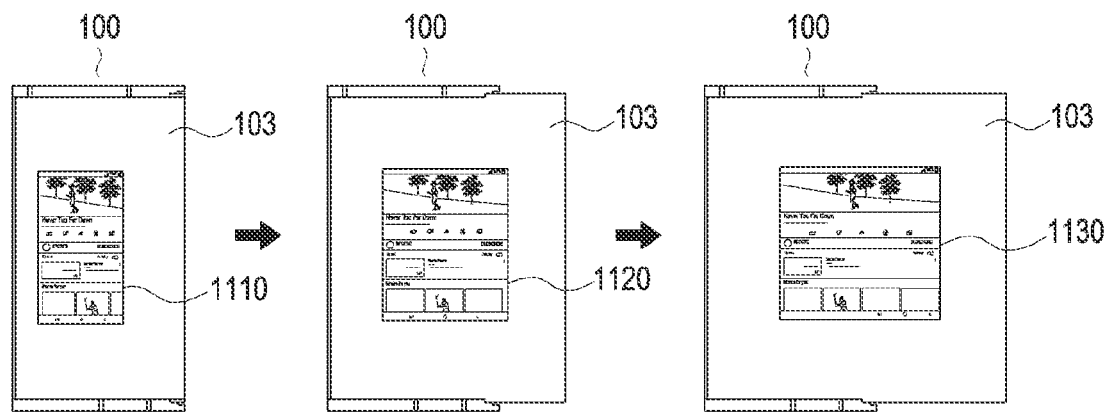

FIGS. 11A and 11B are diagrams illustrating methods for displaying, by an electronic device including a flexible display, a screen in an area extended or reduced by rolling movement or sliding movement of the flexible display, according to embodiments.

Referring to FIGS. 11A and 11B, the electronic device 100 displays a first screen on the flexible display 103 before rolling movement or sliding movement is identified. The electronic device 100 may identify rolling movement or sliding movement of the flexible display 103 in a state in which the first screen is displayed. For example, by the rolling movement or the sliding movement, a display area of the flexible display 103 exposed to the outside the housing may extend to the right.

Referring to FIG. 11A, the electronic device 100 displays a second screen 1110 corresponding to the first screen in response to the rolling movement or the sliding movement. For example, the second screen 1110 may be displayed at a first position of (on the left in) the flexible display 103 after the size of the first screen is reduced into a first size.

The electronic device 100 gradually moves the position of the second screen 1110 along the direction of the rolling movement or the sliding movement according to the distance by which the flexible display 103 is moved by the rolling movement or the sliding movement. For example, the electronic device 100 may move the position from the first position to a second position (e.g., to the center) as the rolling movement or the sliding movement is continuously identified. In addition, the electronic device 100 may move the position from the second position to a third position (e.g., to the right) as the rolling movement or the sliding movement is continuously identified. The electronic device 100 may not perform screen redrawing of the second screen 1110 while moving the position of the second screen 1110.

Referring to FIG. 11B, according to the distance by which the flexible display 103 is moved by the rolling movement or the sliding movement, the electronic device 100 gradually increases the size of the second screen 1110 according to the distance of the rolling movement or the sliding movement. For example, as the rolling movement or the sliding movement is continuously identified, the electronic device 100 expands the size from a first size to a second size. The electronic device 100 displays a third screen 1120 having the second size. In addition, as the rolling movement or the sliding movement is continuously identified, the electronic device 100 expands the size from the second size to a third size. The electronic device 100 displays a fourth screen 1130 having the third size. For example, the electronic device 100 may not perform screen redrawing for the second screen 1110 while expanding the size of the second screen 1110.

The electronic device 100 may change the position and the size of the second screen 1100 by using a combination of the methods described in FIGS. 11A and 11B. For example, the electronic device 100 may expand the second screen according to the size corresponding to the distance by which the flexible display 103 is extended or reduced by the rolling movement or the sliding movement, and may display the expanded second screen at the position corresponding to the distance described above.

Figure 12:
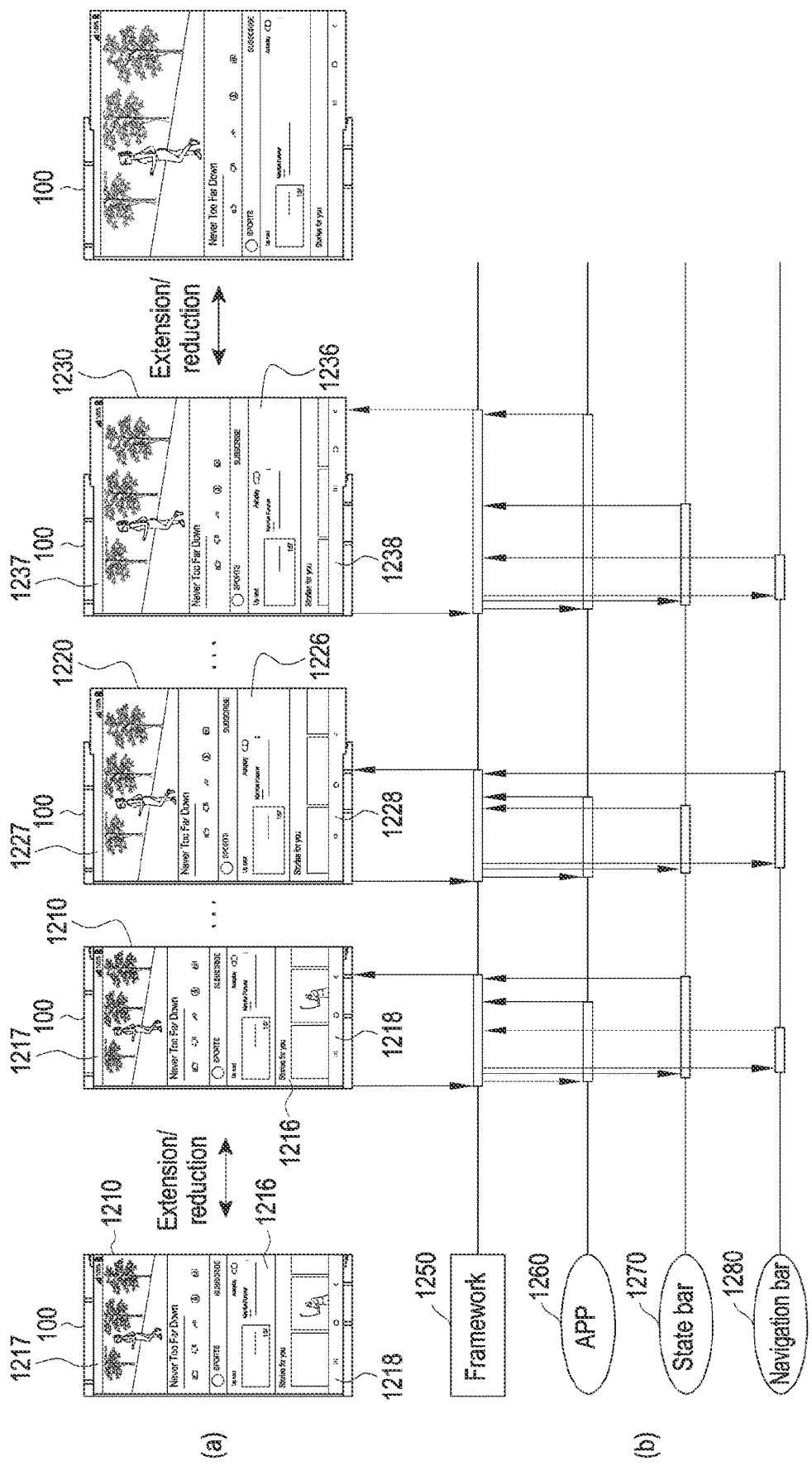
FIG. 12 is a diagram illustrating a method for displaying, by an electronic device including a flexible display, a second screen while performing redrawing of a first screen in an area extended or reduced by rolling movement or sliding movement of the flexible display, according to a power state of a battery, according to an embodiment.

FIG. 12 is a diagram illustrating a method for displaying, by an electronic device including a flexible display, a second screen while performing redrawing of a first screen in an area extended or reduced by rolling movement or sliding movement of the flexible display, according to a power state of a battery, according to an embodiment.

The electronic device 100 displays a first screen 1210 on the flexible display 103. For example, the first screen 1210 includes an execution screen 1216 of an application 1260, a state bar 1217, and a navigation bar 1218.

The electronic device 100 identifies the rolling movement or the sliding movement in a state in which a remaining power level of the battery is higher than a first level. For example, the electronic device of FIG. 12 may be in a state in which remaining power of the battery is sufficient.

When a rolling movement or a sliding movement is identified, the electronic device 100 maintains a display of the first screen 1210. For example, the first screen 1210 may be displayed on all areas of a display area of the flexible display 103. A framework 1250 of the electronic device 100 performs screen redrawing for the first screen 1210. For example, the application 1260, a state bar management program 1270, and a navigation bar management program 1280 identify state information and transmit new screen information including a layout change to the framework 1250 by using the identified state information. The framework 1250 performs screen redrawing for the first screen 1210 by using the received screen information.

The electronic device 100 gradually increases the size of the first screen 1210 as the flexible display 103 continuously increases. The electronic device 100 performs screen redrawing of the application execution screen 1216, the state bar 1217, and the navigation bar 1218 included in the first screen 1210 while changing the size of the first screen 1210. For example, the electronic device 100 may perform screen redrawing multiple times according to a signal of a sensor for detecting the rolling movement or the sliding movement. The electronic device 100 displays a second screen 1220 obtained by increasing the size of the first screen 1210. The second screen 1220 is displayed in all areas of the display area of the flexible display 103. The second screen includes an application execution screen 1226, a state bar 1227, and a navigation bar 1228, for which screen redrawing has been performed. The application 1260, the state bar management program 1270, and the navigation bar management program 1280 may identify state information and transmit new screen information including a layout change to the framework 1250 by using the identified state information. The framework 1250 may perform screen redrawing of the second screen 1220 by using the received screen information.

The electronic device 100 gradually increases the size of the second screen 1220 as the flexible display 103 contiguously is extended. The electronic device 100 performs screen redrawing for the application execution screen 1226, the state bar 1227, and the navigation bar 1228 included in the second screen 1220 while changing the size of the second screen 1220. For example, the electronic device 100 performs screen redrawing multiple times according to a signal of a sensor for detecting the rolling movement or the sliding movement. The electronic device 100 displays a third screen 1230 obtained by increasing the size of the second screen 1220. The third screen 1230 is displayed in all areas of the display area of the flexible display 103. The third screen 1230 includes an application execution screen 1236, a state bar 1237, and a navigation bar 1238, for which screen redrawing has been performed. The application 1260, the state bar management program 1270, and the navigation bar management program 1280 may identify state information and transmit new screen information including a layout change to the framework 1250 by using the identified state information. The framework 1250 performs screen redrawing of the third screen 1230 by using the received screen information.

When the completion of the rolling movement or the sliding movement is identified, the electronic device 100 may perform screen redrawing of the third screen 1230 and display, on the flexible display 103, a screen obtained by performing screen redrawing.

Figure 13:
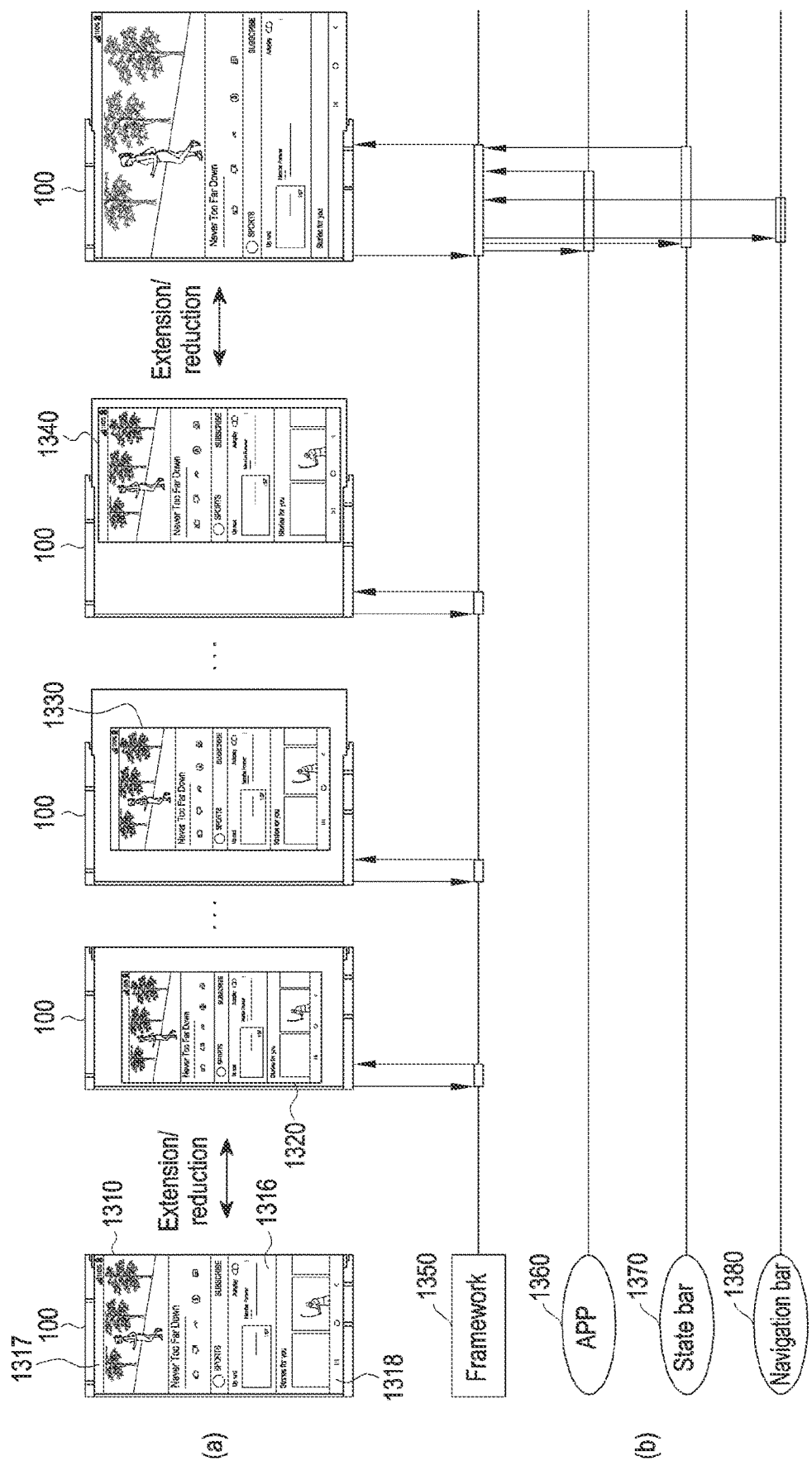
FIG. 13 is a diagram illustrating a method for displaying, by an electronic device including a flexible display, a processed second screen in an area extended or reduced by rolling movement or sliding movement of the flexible display, according to a power state of a battery, without performing redrawing of a first screen, according to an embodiment.

FIG. 13 is a diagram illustrating a method for displaying, by an electronic device including a flexible display, a processed second screen in an area extended or reduced by rolling movement or sliding movement of the flexible display, according to a power state of a battery, without performing redrawing of a first screen, according to an embodiment.

Referring to FIG. 13, the electronic device 100 displays the first screen 1310 on the flexible display 103. For example, the first screen 1310 includes an application execution screen 1316, a state bar 1317, and a navigation bar 1318.

The electronic device 100 may identify rolling movement or sliding movement in a state in which remaining power level of a battery is not higher than a first level and is higher than a second level. For example, the electronic device of FIG. 13 may be in a state in which remaining power of the battery is not sufficient.

When a rolling movement or a sliding movement is identified, the electronic device 100 displays a second screen 1320 obtained by processing a first screen 1310, without performing screen redrawing including a layout change of the first screen 1310. For example, the electronic device 100 displays the second screen 1320 obtained by reducing the size of the first screen 1310. The electronic device 100 displays the second screen 1320 in a left area of a display area of the flexible display 103. The electronic device 100 does not perform screen redrawing of the first screen 1310 while changing the size and the position of the first screen 1210. For example, a framework 1350 of the electronic device 100 does not perform screen redrawing including a layout change of an application 1360, a state bar management program 1370, and a navigation bar management program 1380 related to the first screen 1310. That is, the framework 1350 displays the second screen 1320 while not performing redrawing of the application 1360, the state bar management program 1370, and the navigation management program 1370, which may be caused by the changed screen size.

The electronic device 100 displays a third screen 1330 obtained by processing the second screen 1320, without performing screen redrawing including a layout change of the second screen 1320 as the flexible display 103 is continuously extended. For example, the electronic device 100 gradually increases the size of the second screen 1320 as the flexible display 103 is continuously extended, and may move the position of the third screen 1330 having the increased size along the direction of the sliding movement. The electronic device 100 displays the third screen 1330 obtained by increasing the size of the second screen 1320 and changing the position of the second screen 1320. The electronic device 100 does not perform screen redrawing of the first screen 1310 while changing the size and the position of the first screen 1210. For example, the framework 1350 of the electronic device 100 does not perform screen redrawing including a layout change of the application 1360, the state bar management program 1370, and the navigation bar management program 1380 related to the first screen 1310. That is, the framework 1350 displays the third screen 1330 while not performing redrawing of the application 1360, the state bar management program 1370, and the navigation management program 1370, which may be caused by the changed screen size.

As the flexible display 103 is continuously extended, the electronic device 100 displays a fourth screen 1340 obtained by processing the third screen 1330, without performing screen redrawing including a layout change of the third screen 1330. For example, as the flexible display 103 is continuously extended, the electronic device 100 gradually increases the size of the third screen 1330 and moves the position of the fourth screen 1340 having the increased size along the direction of the sliding movement. The electronic device 100 does not perform screen redrawing of the first screen 1310. For example, the framework 1350 of the electronic device 100 does not identify state information of the application 1360, the state bar management program 1370, and the navigation bar management program 1380 related to the first screen 1310. That is, the framework 1350 displays the fourth screen 1340 without identifying the state information of the first screen 1310.

When completion of the rolling movement or the sliding movement is identified, the electronic device 100 performs screen redrawing of the first screen 1310 and displays, on the flexible display 103, a screen obtained by perform screen redrawing.

In FIG. 13, the electronic device 100 displays the second screen 1320 having a reduced size compared to the first screen 1320, but the technical idea of the disclosure may not be limited thereto. For example, in response to the rolling movement or the sliding movement, the electronic device 100 may display a screen identical to the first screen 1320 and may increase (or reduce) the size of the first screen 1320 and move the position of the first screen 1320 as the flexible display 103 is continuously extended or reduced. In addition, the electronic device 100 may change the filter processing or the brightness of the first screen 1320 in response to the rolling movement or the sliding movement.

Figure 14:
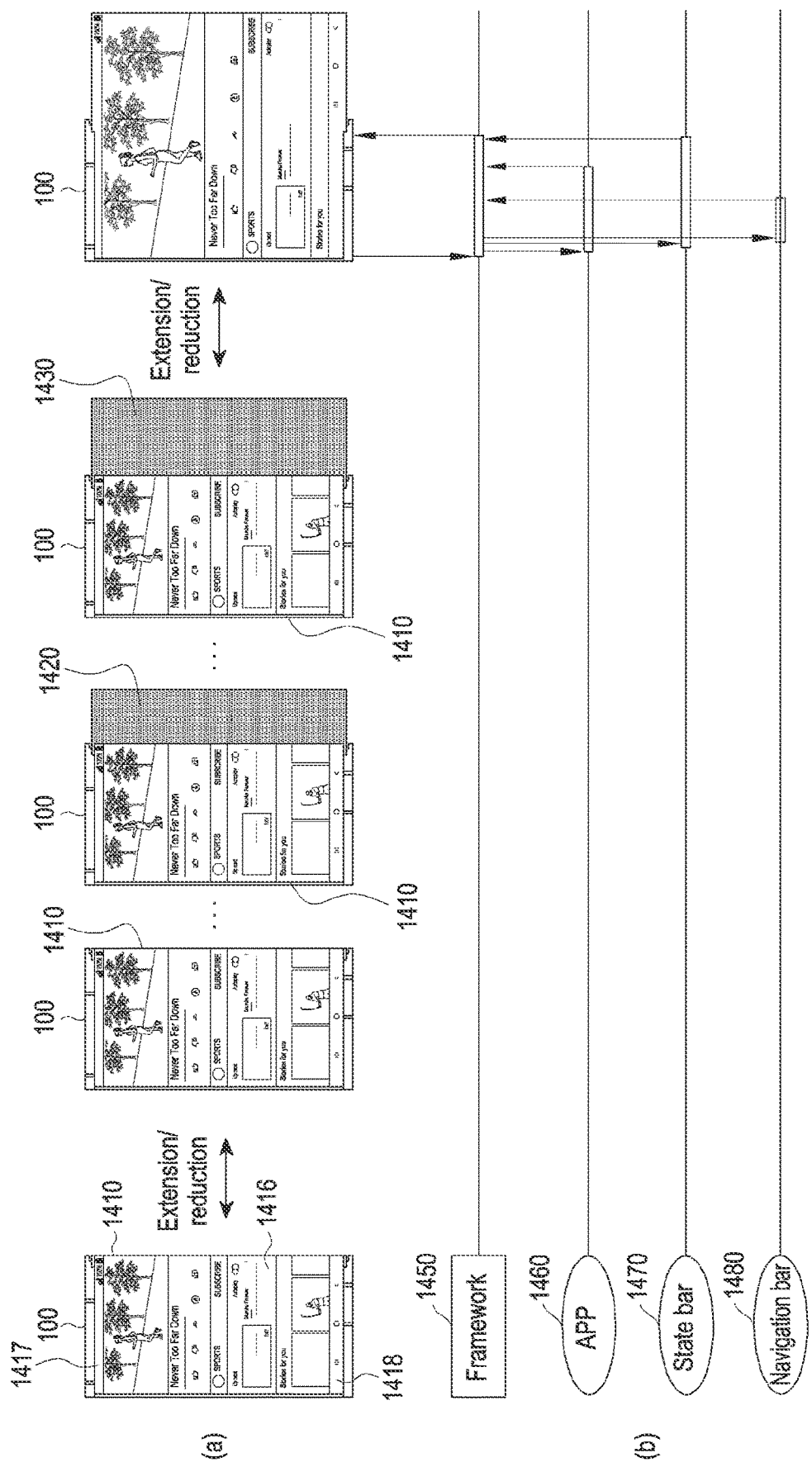
FIG. 14 is a diagram illustrating illustrates a method for displaying, by an electronic device including a flexible display, a screen in an area extended or reduced by rolling movement or sliding movement of the flexible display, according to a power state of a battery, according to an embodiment.

FIG. 14 is a diagram illustrating a method for displaying, by an electronic device including a flexible display, a screen in an area extended or reduced by a rolling movement or a sliding movement of the flexible display, according to a power state of a battery, according to an embodiment.

Referring to FIG. 14, the electronic device 100 displays a first screen 1410 on the flexible display 103. The first screen 1410 includes an application execution screen 1416, a state bar 1417, and a navigation bar 1418.

The electronic device 100 identifies a rolling movement or a sliding movement when remaining power level of the battery is not higher than a second level, which is lower than a first level. For example, the electronic device of FIG. 14 is in a state in which remaining power of the battery is not sufficient.

The electronic device 100 maintains a display of the first screen 1410 when the rolling movement or the sliding movement is identified. In addition, the electronic device 100 does not perform screen redrawing of the first screen 1410. For example, a framework 1450 of the electronic device 100 does not perform screen redrawing including a layout change of the application 1460, the state bar management program 1470, and the navigation bar management program 1480 related to the first screen 1410. That is, the framework 1350 maintains the display of the first screen 1410 in a state in which screen redrawing including a layout change of the first screen 1410 is not performed.

The electronic device 100 maintains the display of the first screen 1410 even through the flexible display 103 is continuously extended. The electronic device 100 does not display a screen in an area 1420 or 1430 other than an area in which the first screen 1410 is displayed when a display area of the flexible display 103 exposed to the outside of the housing is gradually expanded. In addition, the electronic device 100 does not perform screen redrawing of the first screen 1410 while the flexible display 103 is continuously extended.

The electronic device 100 may display a pre-designated screen in an area 1420 or 1430 other than an area in which the first screen 1410 is displayed. For example, the electronic device 100 may display the pre-designated screen by using a display driving integrated circuit (IC) without a control of a processor. An operation of the electronic device 100 related to displaying of the pre-designated screen by using the display driving IC is described in greater detail below with respect to FIG. 15.

When completion of the rolling movement or the sliding movement is identified, the electronic device 100 performs screen redrawing of the first screen 1410 and displays, on the flexible display 103, a screen obtained by performing screen redrawing.

Figure 15:
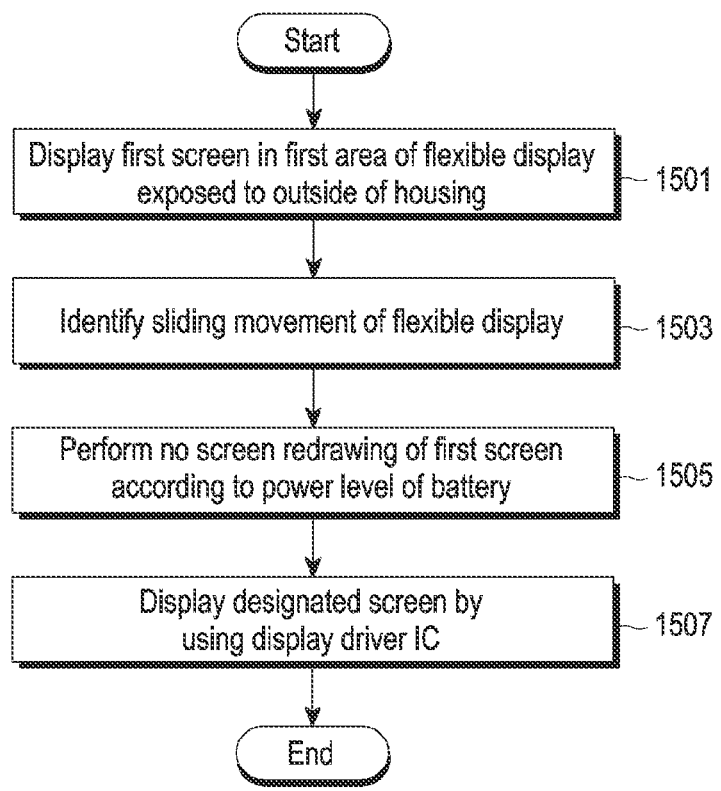
FIG. 15 is a diagram illustrating a method for displaying, by an electronic device including a flexible display, a screen in an area extended or reduced by rolling movement or sliding movement of the flexible display, according to an embodiment.

FIG. 15 is a diagram illustrating a method for displaying, by an electronic device including a flexible display, a screen in an area extended or reduced by rolling movement or sliding movement of the flexible display, according to an embodiment.

1501 to 1507 of FIG. 15 may be performed by at least one component of the electronic device 100.

At 1501, the electronic device 100 displays a first screen in a first area of the flexible display 103.

At 1503, the electronic device 100 identifies a rolling movement or a sliding movement of the flexible display.

At 1505, the electronic device 100 does not perform screen redrawing of the first screen according to a power state of a battery. For example, the power level of the battery is not higher than a second level, which is lower than a first level.

At 1507, the electronic device 100 displays a pre-designated screen in an area in which no screen redrawing is performed, by using a display driver IC. For example, the electronic device 100 may display a pre-configured image (or background) in the third area 1420 of FIG. 14 by using the display driver IC. Alternatively, the electronic device 100 may change a resolution scale of the first screen 1410 and display the expanded first screen 1410 in a display area of the flexible display 103, the display area including the third area 1420 of FIG. 14, by using the display driver IC. Similarly, the electronic device 100 may display a pre-configured image (or background) in the fourth area 1430 of FIG. 14 by using the display driver IC. Alternatively, the electronic device 100 may change a resolution scale of the first screen 1410 and display the expanded first screen 1410 in a display area of the flexible display 103, the display area including the fourth area 1430 of FIG. 14, by using the display driver IC.

Figure 16:
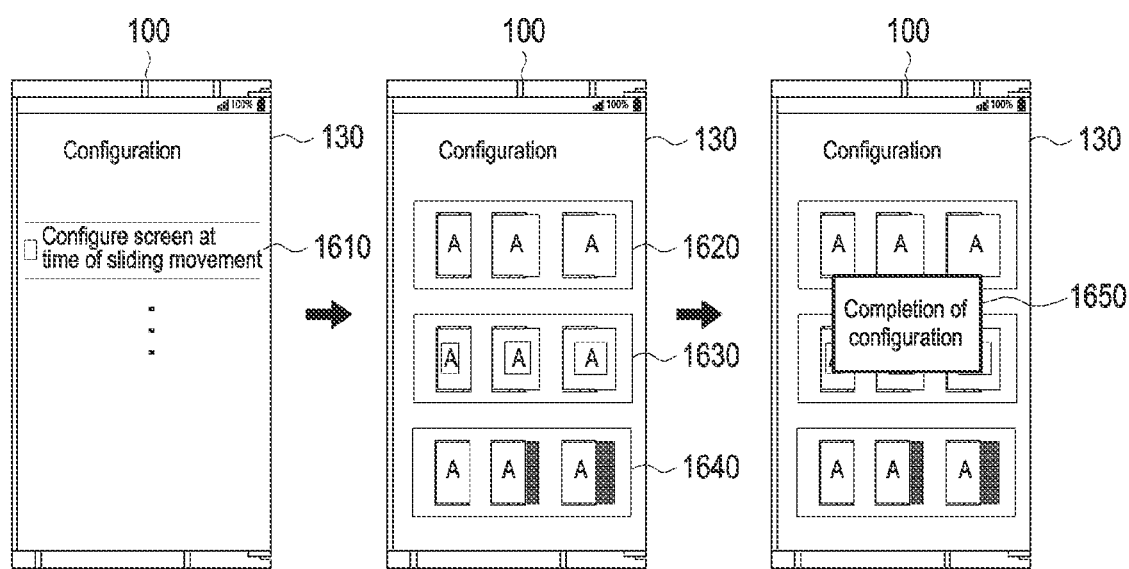
FIG. 16 is a diagram illustrating a method for configuring, by an electronic device including a flexible display, a screen in an area extended or reduced by sliding movement of the flexible display, according to an embodiment.

FIG. 16 is a diagram illustrating a method for configuring, by an electronic device including a flexible display, a screen in an area extended or reduced by sliding movement of the flexible display, according to an embodiment.

Referring to FIG. 16, the electronic device 100 displays, on the flexible display 103, a first setting screen for configuring a screen. The first setting screen includes a first object 1610 that enables a setting of a screen at the time of sliding movement.

The electronic device 100 displays a second setting screen in response to a user input of the first object 1610. The second setting information includes a first screen mode object 1620, a second screen mode object 1630, and a third screen mode object 1640. For example, the first screen mode object 1620 indicates a mode for configuring a screen according to the method described in FIG. 12. The second screen mode object 1630 indicates a mode for configuring a screen according to the method described in FIG. 13. The third screen mode object 1640 indicates a mode for configuring a screen according to the method described in FIG. 14.

The electronic device 100 configures a screen to be displayed at the time of sliding movement according to a screen mode corresponding to a selected object when a user input of one of the first screen mode object 1620, the second screen mode object 1630, and the third screen mode object 1640 is identified. In addition, in response to the user input of selecting an object, the electronic device displays a pop-up window 1650 indicating completion of configuration. Thereafter, when a sliding movement of the flexible display 103 is identified, the electronic device 100 displays a screen according to the configured screen mode during the sliding movement.

Although FIG. 16 illustrates a method for configuring a screen according to sliding movement of the flexible display, the same technical idea of the disclosure may be applied to a method for configuring a screen according to a rolling movement.

The electronic device 100 described above may be implemented in a manner identical or similar to that for an electronic device described below with respect to FIG. 17.

Figure 17:
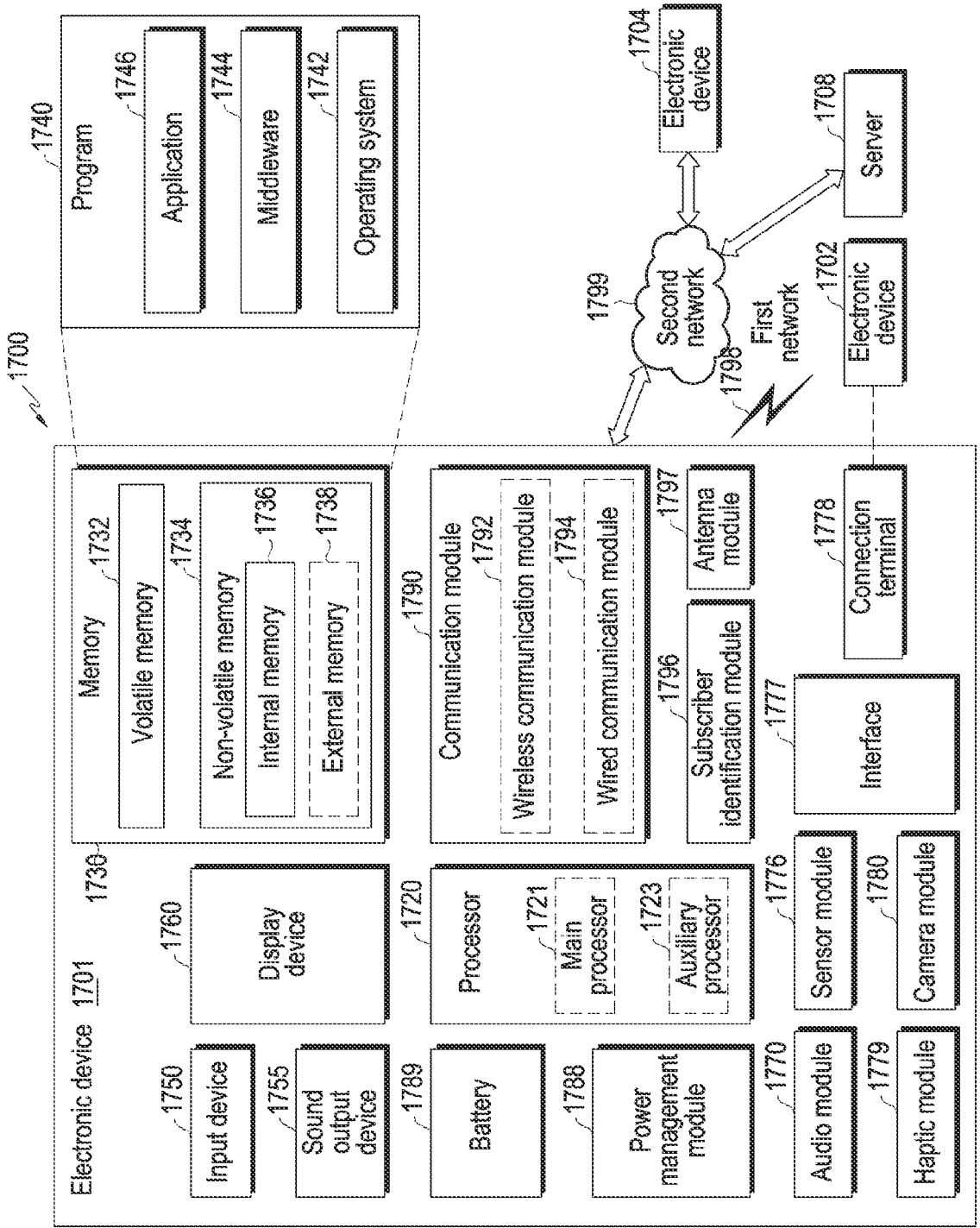
FIG. 17 is a block diagram illustrating an electronic device in a network environment, according to an embodiment.

FIG. 17 is a block diagram illustrating an electronic device in a network environment according to an embodiment.

FIG. 17 is a block diagram illustrating an electronic device 1701 in a network environment 1700 according to various embodiments. Referring to FIG. 17, the electronic device 1701 in the network environment 1700 may communicate with an electronic device 1702 via a first network 1798 (e.g., a short-range wireless communication network), or an electronic device 1704 or a server 1708 via a second network 1799 (e.g., a long-range wireless communication network). According to an embodiment, the electronic device 1701 may communicate with the electronic device 1704 via the server 1708. According to an embodiment, the electronic device 1701 may include a processor 1720, memory 1730, an input module 1750, a sound output module 1755, a display module 1760, an audio module 1770, a sensor module 1776, an interface 1777, a connecting terminal 1778, a haptic module 1779, a camera module 1780, a power management module 1788, a battery 1789, a communication module 1790, a subscriber identification module (SIM) 1796, or an antenna module 1797. In some embodiments, at least one of the components (e.g., the connecting terminal 1778) may be omitted from the electronic device 1701, or one or more other components may be added in the electronic device 1701. In some embodiments, some of the components (e.g., the sensor module 1776, the camera module 1780, or the antenna module 1797) may be implemented as a single component (e.g., the display module 1760).

The processor 1720 may execute, for example, software (e.g., a program 1740) to control at least one other component (e.g., a hardware or software component) of the electronic device 1701 coupled with the processor 1720, and may perform various data processing or computation. According to one embodiment, as at least part of the data processing or computation, the processor 1720 may store a command or data received from another component (e.g., the sensor module 1776 or the communication module 1790) in volatile memory 1732, process the command or the data stored in the volatile memory 1732, and store resulting data in non-volatile memory 1734. According to an embodiment, the processor 1720 may include a main processor 1721 (e.g., a central processing unit (CPU) or an application processor (AP)), or an auxiliary processor 1723 (e.g., a graphics processing unit (GPU), a neural processing unit (NPU), an image signal processor (ISP), a sensor hub processor, or a communication processor (CP)) that is operable independently from, or in conjunction with, the main processor 1721. For example, when the electronic device 1701 includes the main processor 1721 and the auxiliary processor 1723, the auxiliary processor 1723 may be adapted to consume less power than the main processor 1721, or to be specific to a specified function. The auxiliary processor 1723 may be implemented as separate from, or as part of the main processor 1721.

The auxiliary processor 1723 may control, for example, at least some of functions or states related to at least one component (e.g., the display module 1760, the sensor module 1776, or the communication module 1790) among the components of the electronic device 1701, instead of the main processor 1721 while the main processor 1721 is in an inactive (e.g., sleep) state, or together with the main processor 1721 while the main processor 1721 is in an active (e.g., executing an application) state. According to an embodiment, the auxiliary processor 1723 (e.g., an image signal processor or a communication processor) may be implemented as part of another component (e.g., the camera module 1780 or the communication module 1790) functionally related to the auxiliary processor 1723. According to an embodiment, the auxiliary processor 1723 (e.g., the neural processing unit) may include a hardware structure specified for artificial intelligence model processing. An artificial intelligence model may be generated by machine learning. Such learning may be performed, e.g., by the electronic device 1701 where the artificial intelligence model is performed or via a separate server (e.g., the server 1708). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1730 may store various data used by at least one component (e.g., the processor 1720 or the sensor module 1776) of the electronic device 1701. The various data may include, for example, software (e.g., the program 1740) and input data or output data for a command related thereto. The memory 1730 may include the volatile memory 1732 or the non-volatile memory 1734.

The program 1740 may be stored in the memory 1730 as software, and may include, for example, an operating system (OS) 1742, middleware 1744, or an application 1746.

The input module 1750 may receive a command or data to be used by another component (e.g., the processor 1720) of the electronic device 1701, from the outside (e.g., a user) of the electronic device 1701. The input module 1750 may include, for example, a microphone, a mouse, a keyboard, a key (e.g., a button), or a digital pen (e.g., a stylus pen).

The sound output module 1755 may output sound signals to the outside of the electronic device 1701. The sound output module 1755 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1760 may visually provide information to the outside (e.g., a user) of the electronic device 1701. The display module 1760 may include, for example, a display, a hologram device, or a projector and control circuitry to control a corresponding one of the display, hologram device, and projector. According to an embodiment, the display module 1760 may include a touch sensor adapted to detect a touch, or a pressure sensor adapted to measure the intensity of force incurred by the touch.

The audio module 1770 may convert a sound into an electrical signal and vice versa. According to an embodiment, the audio module 1770 may obtain the sound via the input module 1750, or output the sound via the sound output module 1755 or an external electronic device (e.g., an electronic device 1702 (e.g., a speaker or a headphone)) directly or wirelessly coupled with the electronic device 1701.

The sensor module 1776 may detect an operational state (e.g., power or temperature) of the electronic device 1701 or an environmental state (e.g., a state of a user) external to the electronic device 1701, and then generate an electrical signal or data value corresponding to the detected state. According to an embodiment, the sensor module 1776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1777 may support one or more specified protocols to be used for the electronic device 1701 to be coupled with the external electronic device (e.g., the electronic device 1702) directly or wirelessly. According to an embodiment, the interface 1777 may include, for example, a high definition multimedia interface (HDMI), a universal serial bus (USB) interface, a secure digital (SD) card interface, or an audio interface.

A connecting terminal 1778 may include a connector via which the electronic device 1701 may be physically connected with the external electronic device (e.g., the electronic device 1702). According to an embodiment, the connecting terminal 1778 may include, for example, a HDMI connector, a USB connector, an SD card connector, or an audio connector (e.g., a headphone connector).

The haptic module 1779 may convert an electrical signal into a mechanical stimulus (e.g., a vibration or a movement) or electrical stimulus which may be recognized by a user via his tactile sensation or kinesthetic sensation. According to an embodiment, the haptic module 1779 may include, for example, a motor, a piezoelectric element, or an electric stimulator.

The camera module 1780 may capture a still image or moving images. According to an embodiment, the camera module 1780 may include one or more lenses, image sensors, image signal processors, or flashes.

The power management module 1788 may manage power supplied to the electronic device 1701. According to one embodiment, the power management module 1788 may be implemented as at least part of, for example, a power management integrated circuit (PMIC).

The battery 1789 may supply power to at least one component of the electronic device 1701. According to an embodiment, the battery 1789 may include, for example, a primary cell which is not rechargeable, a secondary cell which is rechargeable, or a fuel cell.

The communication module 1790 may support establishing a direct (e.g., wired) communication channel or a wireless communication channel between the electronic device 1701 and the external electronic device (e.g., the electronic device 1702, the electronic device 1704, or the server 1708) and performing communication via the established communication channel. The communication module

1790 may include one or more communication processors that are operable independently from the processor 1720 (e.g., the application processor (AP)) and supports a direct (e.g., wired) communication or a wireless communication. According to an embodiment, the communication module 1790 may include a wireless communication module 1792 (e.g., a cellular communication module, a short-range wireless communication module, or a global navigation satellite system (GNSS) communication module) or a wired communication module 1794 (e.g., a local area network (LAN) communication module or a power line communication (PLC) module). A corresponding one of these communication modules may communicate with the external electronic device 1704 via the first network 1798 (e.g., a short-range communication network, such as Bluetooth™, wireless-fidelity (Wi-Fi) direct, or infrared data association (IrDA)) or the second network 1799 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1792 may identify or authenticate the electronic device 1701 in a communication network, such as the first network 1798 or the second network 1799, using subscriber information (e.g., international mobile subscriber identity (IMSI)) stored in the SIM 1796.

The wireless communication module 1792 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1792 may support a high-frequency band (e.g., the mmWave band) to achieve, e.g., a high data transmission rate. The wireless communication module 1792 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1792 may support various requirements specified in the electronic device 1701, an external electronic device (e.g., the electronic device 1704), or a network system (e.g., the second network 1799). According to an embodiment, the wireless communication module 1792 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1797 may transmit or receive a signal or power to or from the outside (e.g., the external electronic device) of the electronic device 1701. According to an embodiment, the antenna module 1797 may include an antenna including a radiating element composed of a conductive material or a conductive pattern formed in or on a substrate (e.g., a printed circuit board (PCB)). According to an embodiment, the antenna module 1797 may include a plurality of antennas (e.g., array antennas). In such a case, at least one antenna appropriate for a communication scheme used in the communication network, such as the first network 1798 or the second network 1799, may be selected, for example, by the communication module 1790 from the plurality of antennas. The signal or the power may then be transmitted or received between the communication module 1790 and the external electronic device via the selected at least one antenna. According to an embodiment, another component (e.g., a radio frequency integrated circuit (RFIC)) other than the radiating element may be additionally formed as part of the antenna module 1797.

According to various embodiments, the antenna module 1797 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1701 and the external electronic device 1704 via the server 1708 coupled with the second network 1799. Each of the electronic devices 1702 or 1704 may be a device of a same type as, or a different type, from the electronic device 1701. According to an embodiment, all or some of operations to be executed at the electronic device 1701 may be executed at one or more of the external electronic devices 1702, 1704, or 1708. For example, if the electronic device 1701 should perform a function or a service automatically, or in response to a request from a user or another device, the electronic device 1701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1701. The electronic device 1701 may provide the outcome, with or without further processing of the outcome, as at least part of a reply to the request. To that end, a cloud computing, distributed computing, mobile edge computing (MEC), or client-server computing technology may be used, for example.

The electronic device 1701 may provide ultra low-latency services using, e.g., distributed computing or mobile edge computing. In another embodiment, the external electronic device 1704 may include an internet-of-things (IoT) device. The server 1708 may be an intelligent server using machine learning and/or a neural network. According to an embodiment, the external electronic device 1704 or the server 1708 may be included in the second network 1799. The electronic device 1701 may be applied to intelligent services (e.g., smart home, smart city, smart car, or healthcare) based on 5G communication technology or IoT-related technology.

An electronic device is provided that includes a battery and a flexible display that is rollable or slidable by a housing or a display support of the electronic device. A size of a display area of the flexible display, which is exposed to outside of the housing, is changed by a rolling movement or a sliding movement of the flexible display. The electronic device also includes a processor disposed in the housing. The processor is configured to display a first screen of a first function in a first area of the flexible display exposed to the outside of the housing. When the rolling movement or the sliding movement of the flexible display is identified, device state information including information on a power level of the battery is acquired. A first screen redrawing method is determined from among multiple screen redrawing methods by using the device state information. During the rolling movement or the sliding movement of the flexible display, a second screen corresponding to the first screen is displayed in a second area of the flexible display that is exposed to the outside of the housing by the rolling movement or the sliding movement, according to the first screen redrawing method.

The processor may be further configured to, when the power level of the battery is higher than a first level, display the second screen in an entire display area exposed to the outside the housing, which is extended or reduced by the rolling movement or the sliding movement of the flexible display. Screen redrawing has been performed with respect to the second screen in response to the rolling movement or the sliding movement of the flexible display.

The electronic device may further include a sensor configured to detect the rolling movement or the sliding movement of the flexible display. The processor may be further configured to perform the screen redrawing according to a period of a signal detected from the sensor.

The processor may be further configured to, when the power level of the battery is lower than or equal to a first level and higher than a second level, which is lower than the first level, display the second screen in at least a partial area of the display area of the flexible display. The size of the display area has been changed by the rolling movement or the sliding movement of the flexible display, and the second screen is obtained by changing at least one of a size, a position, a filter processing, and a brightness of the first screen, without performing screen redrawing of objects included in the first screen. Screen redrawing including a layout change of the objects included in the first screen has not been performed with respect to the second screen during the rolling movement or the sliding movement of the flexible display.

The processor maybe further configured to change at least one of the size, the position, the filter processing, and the brightness of the second screen according to a distance by which the flexible display has been extended or reduced by the rolling movement or the sliding movement of the flexible display.

The processor maybe further configured to change at least one of the size, the position, the filter processing, and the brightness of the second screen in real time according to the rolling movement or the sliding movement of the flexible display.

The processor may be further configured to, when the power level of the battery is lower than or equal to a second level, display the second screen, which is identical to the first screen, in the first area of a display area of the flexible display that is exposed to the outside of the housing. The size of the display area has been changed by the rolling movement or the sliding movement of the flexible display. No screen redrawing has been performed with respect to the second screen during the rolling movement or the sliding movement of the flexible display.

The processor may be further configured to perform screen redrawing of the second screen when the rolling movement or the sliding movement of the flexible display has been completed, and display a third screen, for which the screen redrawing has been performed, on the flexible display.

The processor may be further configured to determine that the rolling movement or the sliding movement of the flexible display has been completed when the flexible display is completely extended or reduced.

The processor may be further configured to acquire setting information of a user when the rolling movement or the sliding movement of the flexible display is identified, and display, during the rolling movement or the sliding movement of the flexible display, the second screen in the second area of the flexible display that becomes exposed to the outside of the housing as the flexible display is extended or reduced by the rolling movement or the sliding movement of the flexible display, by using the setting information.

A method is provided for operating an electronic device including a flexible display that is rollable or slidable by a housing or a display support of the electronic device. A size of a display area exposed to the outside of the housing changes by a rolling movement or a sliding movement of the flexible display. A first screen of a first function is displayed in a first area of the flexible display exposed to the outside of the housing. When the rolling movement or the sliding movement of the flexible display is identified, device state information including information indicating a power level of a battery of the electronic device is acquired. A first screen redrawing method is determined from among multiple screen redrawing methods by using the device state information. During the rolling movement or the sliding movement, a second screen corresponding to the first screen is displayed in a second area exposed to the outside of the housing by the rolling movement or the sliding movement of the flexible display, according to the first screen redrawing method.

The displaying of the second screen may include, when the power level of the battery is higher than a first level, displaying the second screen in an entire display area exposed to the outside of the housing, which is extended or reduced by the rolling movement or the sliding movement of the flexible display. The screen redrawing has been performed with respect to the second screen in response to the rolling movement or the sliding movement of the flexible display.

The method for operating the electronic device may further include performing the screen redrawing according to a period of a signal output from a sensor of the electronic device that detects the rolling movement or the sliding movement of the flexible display.

The displaying of the second screen may include, when the power level of the battery is lower than or equal to a first level and higher than a second level, which that is lower than the first level, displaying the second screen in at least a partial area of the display area of the flexible display. The size of the display area has been changed by the rolling movement or the sliding movement of the flexible display, and the second screen is obtained by changing at least one of a size, a position, a filter processing, and a brightness of the first screen, without performing screen redrawing of objects included in the first screen. Screen redrawing including a layout change of the objects included in the first screen has not been performed with respect to the second screen during the rolling movement or the sliding movements of the flexible display.

The displaying of the second screen may include changing at least one of the size, the position, the filter processing, or the brightness of the first screen according to a distance by which the flexible display has been extended or reduced by the rolling movement or the sliding movement of the flexible display.

The method for operating the electronic device may further include changing at least one of the size, the position, the filter processing, and the brightness of the second screen in real time according to the rolling movement or the sliding movement of the flexible display.

The displaying of the second screen may include, when the power level of the battery is lower than or equal to a second level, displaying the second screen, which is identical to the first screen, in the first area of a display area of the flexible display that is exposed to the outside of the housing. The size of the display area has been changed by the rolling movement or the sliding movement of the flexible display. No screen redrawing has been performed with respect to the second screen during the rolling movement or the sliding movement.

The method for operating the electronic device may further include performing screen redrawing of the second screen when the rolling movement or the sliding movement of the flexible display has been completed, and displaying a third screen for which the screen redrawing has been performed, on the flexible display.

The method for operating the electronic device may further include determining that the rolling movement or the sliding movement of the flexible display has been completed when the flexible display is completely extended or reduced.

A non-transitory computer-readable reading medium is provided that stores instructions which, when executed by a processor of an electronic device, cause the processor to display a first screen in a first area exposed to an outside of a housing of in the electronic device. When a rolling movement or a sliding movement of the flexible display is identified, device state information including information indicating a power level of a battery of the electronic device is acquired. A first screen redrawing method is determined from among multiple screen redrawing methods by using the device state information. During the rolling movement or the sliding movement of the flexible display, a second screen corresponding to the first screen is displayed in a second area of the flexible display that becomes exposed to the outside of the housing as the flexible display is extended or reduced by the rolling movement or the sliding movement of the flexible display, according to the first screen redrawing method. The flexible display is rollable or slidable by the housing of the electronic device or a support of the flexible display, and a size of the display area exposed to the outside of the housing changes by the rolling movement or the sliding movement of the flexible display.

While the disclosure has been shown and described with reference to certain embodiments thereof, it will be understood by those skilled in the art that various changes in form and detail may be made therein without departing form the scope of the disclosure. Therefore, the scope of the disclosure should not be defined as being limited to the embodiments, but should be defined by the appended claims and equivalents thereof

What is claimed is:

1. An electronic device comprising:
    a battery;
    a flexible display that is rollable or slidable by a housing or a display support of the electronic device, wherein a size of a display area of the flexible display, which is exposed to outside of the housing, is changed by a rolling movement or a sliding movement of the flexible display; and
    a processor disposed in the housing,
    wherein the processor is configured to:
    display a first screen of a first function in a first area of the flexible display visually exposed to the outside of the housing,
    when the rolling movement or the sliding movement of the flexible display is identified, acquire device state information comprising information on a power level of the battery,
    identify a screen redrawing method, from among a plurality of screen redrawing methods to redraw the first screen while the flexible display is rolling or sliding, based on the device state information, and
    display, while the flexible display is rolling or sliding, a second screen corresponding to the first screen in a second area of the flexible display according to the identified screen redrawing method, wherein the second area is visually exposed to the outside of the housing while the flexible display is rolling or sliding, and
    when the power level of the battery is within a specified range, display, while the flexible display is rolling or sliding, the second screen obtained by one of a first method of having the first screen unchanged without redrawing an object included in the first screen, a second method of changing at least one of a size, a position, a filter, and a brightness of the first screen without redrawing the object included in the first screen, and a third method of changing the size of the first screen according to the changed size of the display area and redrawing the object included in the first screen, based on the identified screen redrawing method corresponding to the specified range.

2. The electronic device of claim 1, wherein the processor is further configured to:
    when the power level of the battery is higher than a first level, display the second screen in an entire display area exposed to the outside of the housing, which is extended or reduced while the flexible display is rolling or sliding,
    wherein screen redrawing has been continuously performed with respect to the second screen in response to the rolling movement or the sliding movement of the flexible display.

3. The electronic device of claim 2, further comprising a sensor configured to detect the rolling movement or the sliding movement of the flexible display,
    wherein the processor is further configured to perform the screen redrawing according to a signal detected from the sensor.

4. The electronic device of claim 1, wherein the processor is further configured to:
    when the power level of the battery is lower than or equal to a first level and higher than a second level, which is lower than the first level, display the second screen in at least a partial area of the display area of the flexible display, wherein the size of the display area has been changed by the rolling movement or the sliding movement of the flexible display, and the second screen is obtained by changing at least one of a size, a position, a filter processing, and a brightness of the first screen, without performing screen redrawing of objects comprised in the first screen,
    wherein the second screen has not performed a layout change of the objects comprised in the first screen while the flexible display is rolling or sliding.

5. The electronic device of claim 4, wherein the processor is further configured to change at least one of the size, the position, the filter processing, and the brightness of the second screen according to a distance by which the flexible display has been extended or reduced while the flexible display is rolling or sliding.

6. The electronic device of claim 5, wherein the processor is further configured to change at least one of the size, the position, the filter processing, and the brightness of the second screen continuously according to the rolling movement or the sliding movement of the flexible display.

7. The electronic device of claim 2, wherein the processor is further configured to:
when the power level of the battery is lower than or equal to a second level which is lower than the first level, display the second screen, which is identical to the first screen, in the first area within a display area of the flexible display that is exposed to the outside of the housing, wherein the size of the display area has been changed by the rolling movement or the sliding movement of the flexible display,
wherein no screen redrawing has been performed with respect to the second screen while the flexible display is rolling or sliding.

8. The electronic device of claim 1, wherein the processor is further configured to:
perform screen redrawing of the second screen
according to the screen redrawing method until the flexible display completes the rolling or sliding.

9. The electronic device of claim 8, wherein the processor is further configured to determine that the flexible display completes the rolling or sliding when the flexible display is completely extended or reduced.

10. The electronic device of claim 1, wherein the processor is further configured to:
acquire setting information related to a user based on identifying the rolling movement or the sliding movement of the flexible display; and
display, while the flexible display is rolling or sliding, the second screen in the second area of the flexible display according to the setting information.

11. A method for operating an electronic device comprising a flexible display which is rollable or slidable by a housing or a display support of the electronic device, wherein a size of a display area of the flexible display exposed to outside of the housing changes by a rolling movement or a sliding movement of the flexible display, the method comprising:
displaying a first screen of a first function in a first area of the flexible display visually exposed to the outside of the housing;
when the rolling movement or the sliding movement of the flexible display is identified, acquiring device state information comprising information indicating a power level of a battery of the electronic device;
identifying a screen redrawing method, from among a plurality of screen redrawing methods to redraw the first screen while the flexible display is rolling or sliding, based on the device state information; and
displaying, while the flexible display is rolling or sliding, a second screen corresponding to the first screen in a second area of the flexible display according to the identified screen redrawing method, wherein the second area is visually exposed to the outside of the housing while the flexible display is rolling or sliding,
wherein displaying the second screen comprises, when the power level of the battery is within a specified range, displaying, while the flexible display is rolling or sliding, the second screen obtained by one of a first method of having the first screen unchanged without redrawing an object included in the first screen, a second method of changing at least one of a size, a position, a filter, and a brightness of the first screen without redrawing the object included in the first screen, and a third method of changing the size of the first screen according to the changed size of the display area and redrawing the object included in the first screen, based on the identified screen redrawing method corresponding to the specified range.

12. The method of claim 11, wherein displaying the second screen comprises:
when the power level of the battery is higher than a first level, displaying the second screen in an entire display area exposed to the outside of the housing, which is extended or reduced while the flexible display is rolling or sliding,
wherein screen redrawing has been continuously performed with respect to the second screen in response to the rolling movement or the sliding movement of the flexible display.

13. The method of claim 12, further comprising performing the screen redrawing according to a signal output from a sensor of the electronic device that detects the rolling movement or the sliding movement of the flexible display.

14. The method of claim 11, wherein displaying the second screen comprises:
when the power level of the battery is lower than or equal to a first level and higher than a second level, which is lower than the first level, displaying the second screen in at least a partial area of the display area of the flexible display, wherein the size of the display area has been changed by the rolling movement or the sliding movement of the flexible display, and the second screen is obtained by changing at least one of a size, a position, a filter processing, and a brightness of the first screen, without performing screen redrawing of objects comprised in the first screen,
wherein the second screen has not performed a layout change of the objects comprised in the first screen while the flexible display is rolling or sliding.

15. The method of claim 14, wherein displaying the second screen comprises changing at least one of the size, the position, the filter processing, and the brightness of the first screen according to a distance by which the flexible display has been extended or reduced while the flexible display is rolling or sliding.

* * * * *